United States Patent [19]

Kichima

[11] Patent Number: 5,255,035
[45] Date of Patent: Oct. 19, 1993

[54] FOCUSING CONTROL APPARATUS FOR A CAMERA

[75] Inventor: Mutsuhito Kichima, Hachioji, Japan

[73] Assignee: Konica Corporation, Tokyo, Japan

[21] Appl. No.: 949,222

[22] Filed: Sep. 18, 1992

Related U.S. Application Data

[62] Division of Ser. No. 713,401, Jun. 10, 1991, Pat. No. 5,162,834.

[30] Foreign Application Priority Data

Jun. 12, 1990 [JP] Japan ............................ 2-153712

[51] Int. Cl.⁵ .................................................. G03B 3/10
[52] U.S. Cl. ................................. 354/195.12; 354/400
[58] Field of Search ................. 354/400, 195.1, 195.12

[56] References Cited

U.S. PATENT DOCUMENTS

| | | | |
|---|---|---|---|
| 4,868,590 | 9/1989 | Yokota et al. | 354/195.1 |
| 4,950,061 | 8/1990 | Tsurukawa et al. | 354/400 |
| 4,990,945 | 2/1991 | Cho et al. | 354/195.12 |
| 5,005,038 | 4/1991 | Ogawa et al. | 354/195.12 |
| 5,146,254 | 9/1992 | Tsurukawa et al. | 354/195.12 |
| 5,150,260 | 9/1992 | Chigira | 354/195.1 |

*Primary Examiner*—Russell E. Adams
*Attorney, Agent, or Firm*—Jordan B. Bierman

[57] ABSTRACT

The invention is directed to a focusing mechanism that provides additional focal movement of the lens system without increasing the depth of the camera. This is accomplished by a bearing connected to lens mounting unit that is slidable along a guide shaft, because a part of the bearing can enter a recess in a support on the main body of the camera.

27 Claims, 21 Drawing Sheets

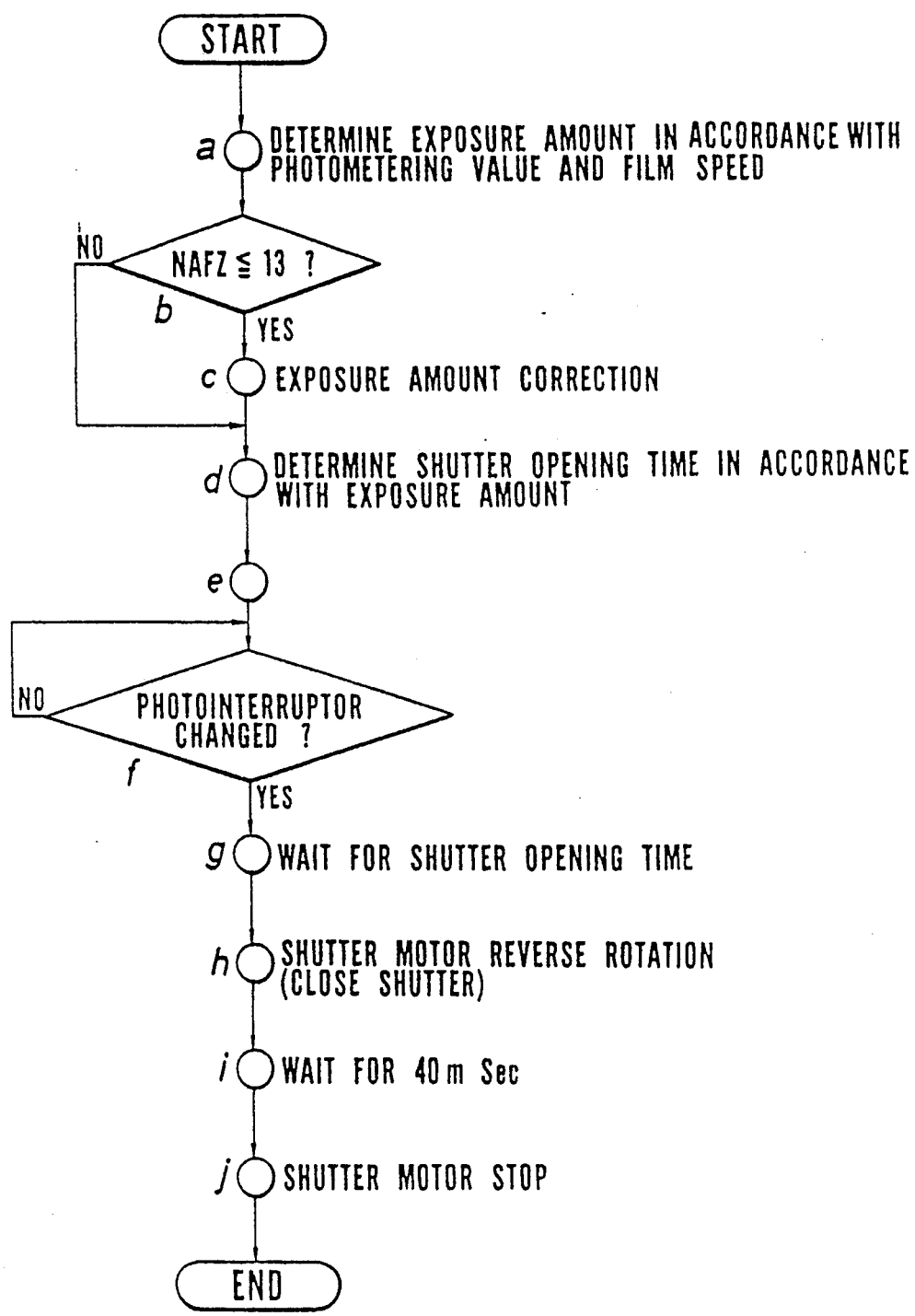

FOCUSING CONTROL APPARATUS FOR A CAMERA

This application is a division of application Ser. No. 07/713401, filed Jun. 10, 1991, now U.S. Pat. No. 5,162,834.

BACKGROUND OF THE INVENTION

1. Field of the Invention

The present invention relates to a focusing control apparatus for a camera.

2. Description of the Prior Art

Although conventional cameras generally have a photographic distance of about 1 m to ∞ as a photographic range, a demand of photographing an object at a closer distance has been increased in recent years, and a camera which enables such close-up photographing has been developed accordingly. In a camera capable of performing close-up photography, however, when an ∞ position is set as an initial position of a photographic lens, a longer stroke is required on an optical axis of a photographic optical system to move the photographic lens to an in-focus position for an object at closer distance, comparing with the required stroke for an object at a close distance. In this camera, a photographer may cause a camera shake or missing a photographic chance, because a prolonged focusing time period for the closer distance delays a shutter release timing.

Conventionally, in order to prevent this inconvenience, a normal distance photographic mode (a mode having a photographic range of about 1 m to ∞) and a close distance photographic mode (a mode having a photographic distance range of about less than 1 m), for example, are provided in a camera, and initial positions of a photographic lens are set for the respective modes. When a photographer operates a mode select switch to select one of the modes, the camera automatically sets the photographic lens at an initial position corresponding to the selected mode.

That is, this conventional camera includes an exclusive select switch as a mode selecting means for selecting the normal or close distance photographic modes, and a photographer has to manipulate the select switch to perform close-up photographing, and this manipulation is cumbersome for him. Therefore, a photographing chance may be missed due to a selecting operation. In addition, to perform photographing of an object at a boundary distance between the normal and close photographic ranges, a photographer has to determine a mode to be selected beforehand to set the mode. This determination is difficult to be made by a beginner and causes an increase of out-focused poor photographs.

SUMMARY OF THE INVENTION

It is an object of the present invention to provide a focusing control apparatus of a camera, which can easily perform normal distance photographing and close distance photographing without performing any particular manipulation based on determination made by a photographer, and the apparatus can perform extension of a photographic lens within a short time period, and can easily improve positional precision of an extension amount of the photographic lens.

BRIEF DESCRIPTION OF THE DRAWINGS

FIG. 12 also illustrates first and second moving regions;

FIGS. 19 to 25 are flow charts for driving an optical system of a camera according to the present invention, in which FIG. 19 is a main flow chart;

FIG. 20 is a flow chart showing a subroutine of moving a photographic lens from a housing position to an initial position;

FIG. 21 is a flow chart showing a subroutine of moving the photographic lens from the initial position to the housing position;

FIG. 22 is a flow chart showing a subroutine of moving the photographic lens from the initial position to an in-focus position;

FIG. 23 is a flow chart showing a subroutine of moving the photographic lens from the in-focus position to the initial position;

FIG. 24 is a flow chart showing a subroutine of moving the photographic lens from the initial position to the in-focus position according to another embodiment of the present invention; and FIG. 25 is a flow chart for shifting an exposure amount in accordance with the in-focus position.

DETAILED DESCRIPTION OF THE PREFERRED EMBODIMENTS

Embodiments of the present invention will be described in detail below with reference to the accompanying drawings.

Camera Body

Figure 1:
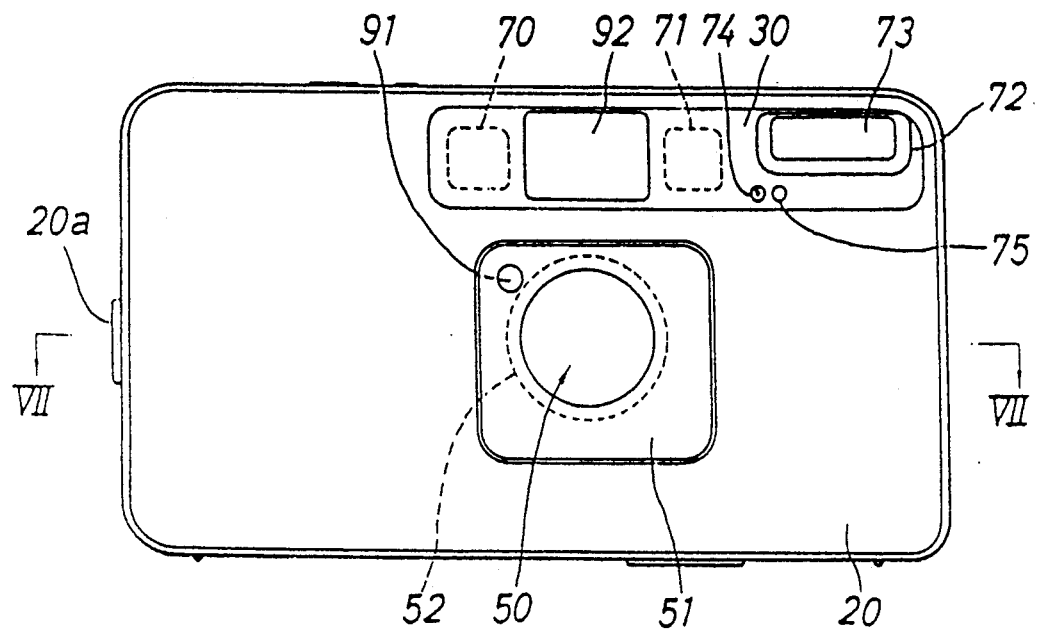
FIG. 1 is a front view of a camera to which a focusing control apparatus according to the present invention is included.
Figure 2:
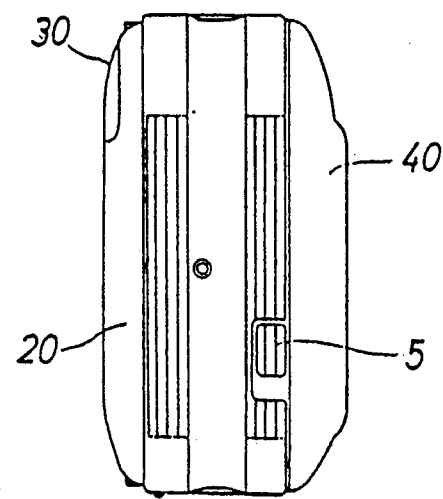
FIG. 2 is a right side view of the camera shown in FIG. 1.
Figure 3:
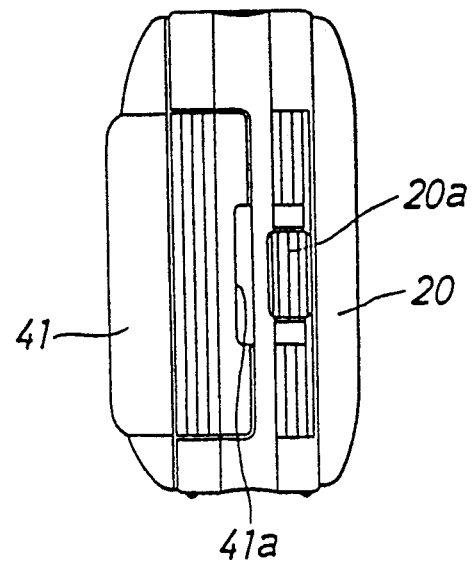
FIG. 3 is a left side view of the camera shown in FIG. 1.
Figure 4:
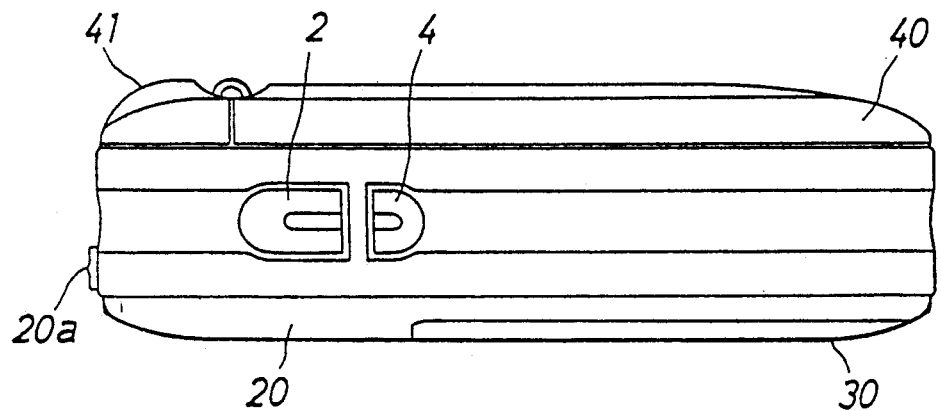
FIG. 4 is a plan view of the camera shown in FIG. 4.
Figure 5:
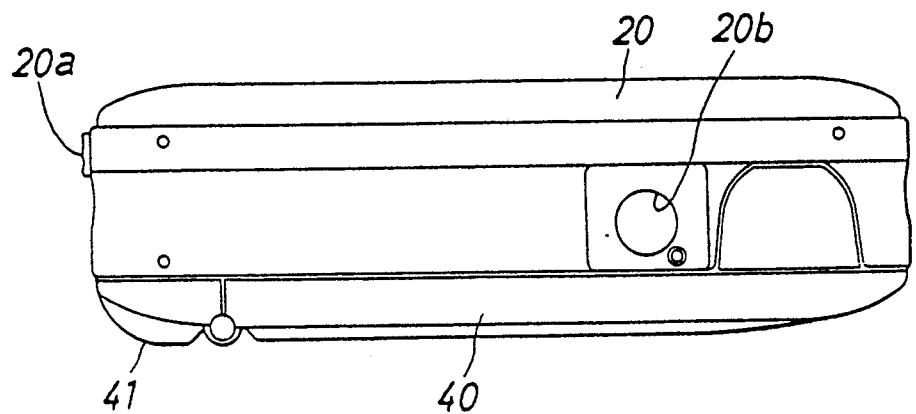
FIG. 5 is a bottom view of the camera shown in FIG. 1.
Figure 6:
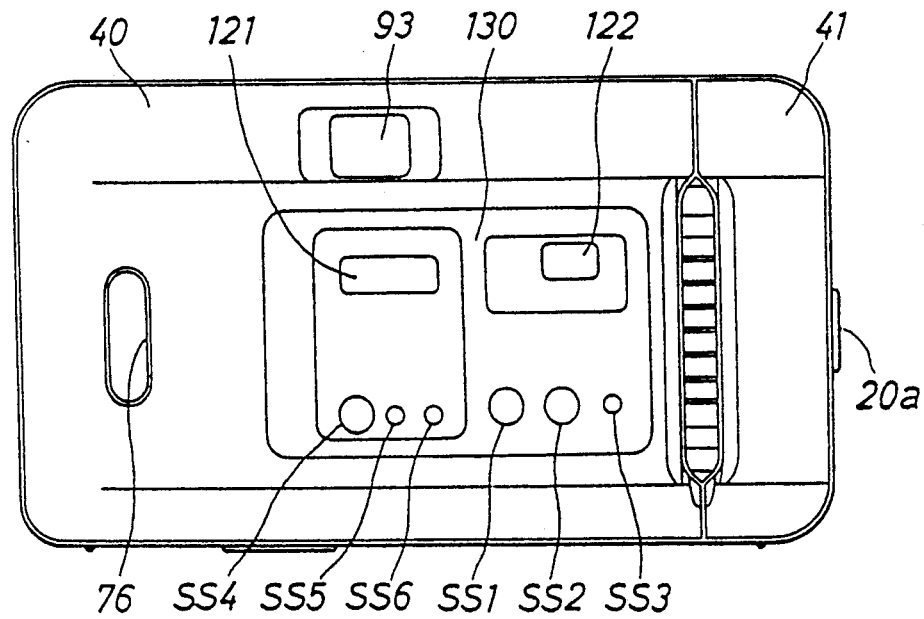
FIG. 6 is a back view of the camera shown in FIG. 1.
Figure 7:
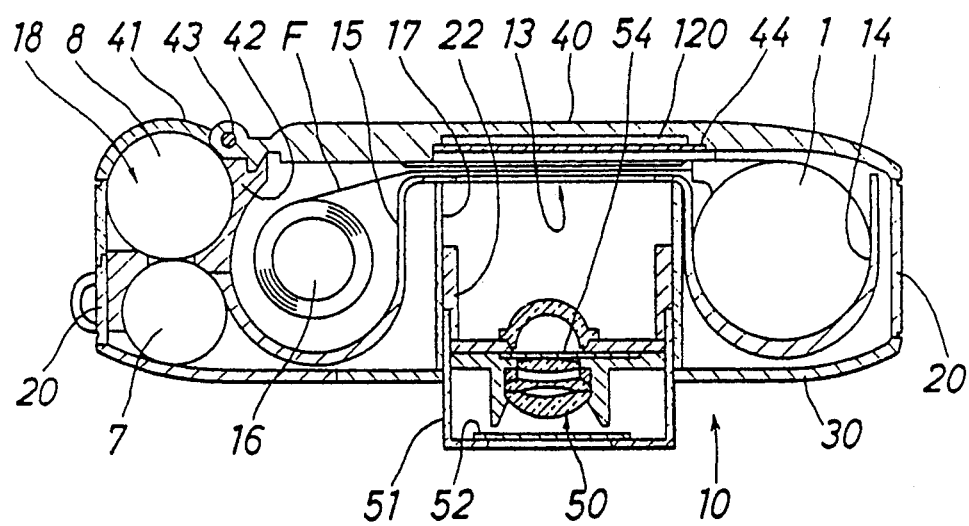
FIG. 7 is a sectional view taken along a line VII—VII of FIG. 1.

As shown in FIG. 7, the camera is constituted by a main body 10, a front cover 20, a dustproof panel 30, a back cover 40, and a battery cover 41. The dustproof panel 30 is engaged with the front side of the front cover 20, and the front cover 20 is engaged to the main body 10 and fixed by screws to cover the main body 10. The back cover 40 and the battery cover 41 are assembled integrally with a main body mount member 42 via a hinge shaft 43 so as to be freely opened and closed. The main body mount member 42 is engaged with the main body 10 and fixed by screws.

A patrone housing chamber 14 and a film winding chamber 15 are formed in the main body 10 and between them an image frame portion 13 is formed. The patrone chamber 14 houses a patrone 1, and a film F is wound by a reel 16 arranged in the film wind chamber 15 after it is exposed.

A front base plate 17 is mounted to a central portion of the main body 10. A lens barrel frame 22 holding a photographic lens 50 is mounted together with a barrel 51 on the front base plate 17, so as to reciprocate along the optical axis of the photographic lens 50. A shutter 54 is arranged between lenses of the photographic lens 50, and the photographic lens 50 is normally covered with a filter 52 provided on the barrel 51. This filter 52 protects the photographic lens 50.

In the main body 10, a charge capacitor 7 of a strobe is arranged near the film wind chamber 15, and a lithium battery 8 is housed in a battery chamber 18.

A control display portion 120 for automatic superimposing a date or photographic information is mounted on the inner surface of the back cover 40 via a back base plate 44. An LCD frame plate 130 is mounted on the outer surface of the back cover 40.

A shutter release button 2 and a main switch button 4 are arranged on the upper surface of the camera. When the main switch button 4 is depressed, the barrel 51 is extended and a photographing enable state is set. When the main switch button 4 is depressed again, the barrel 51 is retracted and housed in the main body 10, and the front surfaces of the barrel 51 and the front cover 20 make a same plane, thereby the photographing enable state is disabled.

A back cover release button 5 is arranged on the right side of the camera. The back cover 40 can be opened by sliding the button 5 downward.

A battery cover release member 41a for the battery cover 41 is arranged on the left side of the camera, and a strap connector 20a is formed on the front cover 20.

A tripod mount hole 20b is arranged on the front cover 20 at the bottom portion of the camera.

On the front surface of the camera, an AE light-receiving window 91 is formed in the barrel 51 of the photographic lens 50, a finder 92 is arranged at a position of the dustproof panel 30 above the photographic lens 50, and a light-emitting AF lens 70 and a light-receiving AF lens 71 of a distance measuring device for focusing control are arranged on both sides of the finder 92. A window 72 formed in the dustproof panel 30 covers a strobe light-emitting portion 73, and a self timer mark 74 and a self timer indication window 75 are formed below the window 72.

On the back surface of the camera, a film presence check window 76 and an eyepiece window 93 of the finder 92 are formed in the back cover 40. A date information display portion 121 and a photographic information display portion 122 are formed on the inner surface of the LCD frame plate 130 of the back cover 40. The back surface of the camera also mounts a strobe mode switch button SS1, a self timer switch SS2, a film rewind switch SS3, a date mode switch button SS4, a portion select button SS5 for selecting a portion of date and time to be corrected, and a change button SS6 for changing a date display.

Optical System Drive Mechanism

Figure 8:
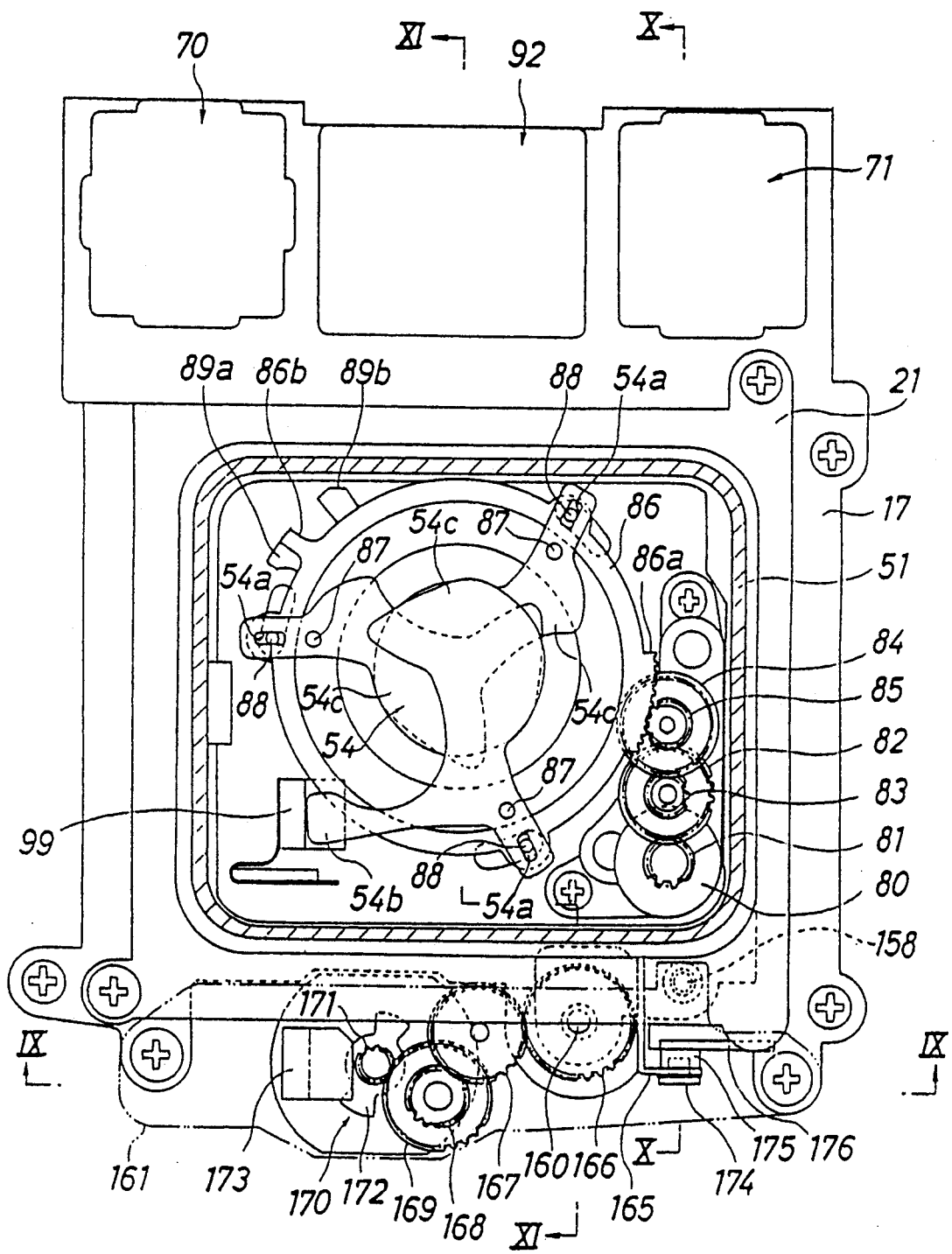
FIG. 8 is a sectional view showing a lens barrel portion of an optical system drive mechanism of a camera to which a focusing control apparatus according to the present invention is applied.
Figure 9:
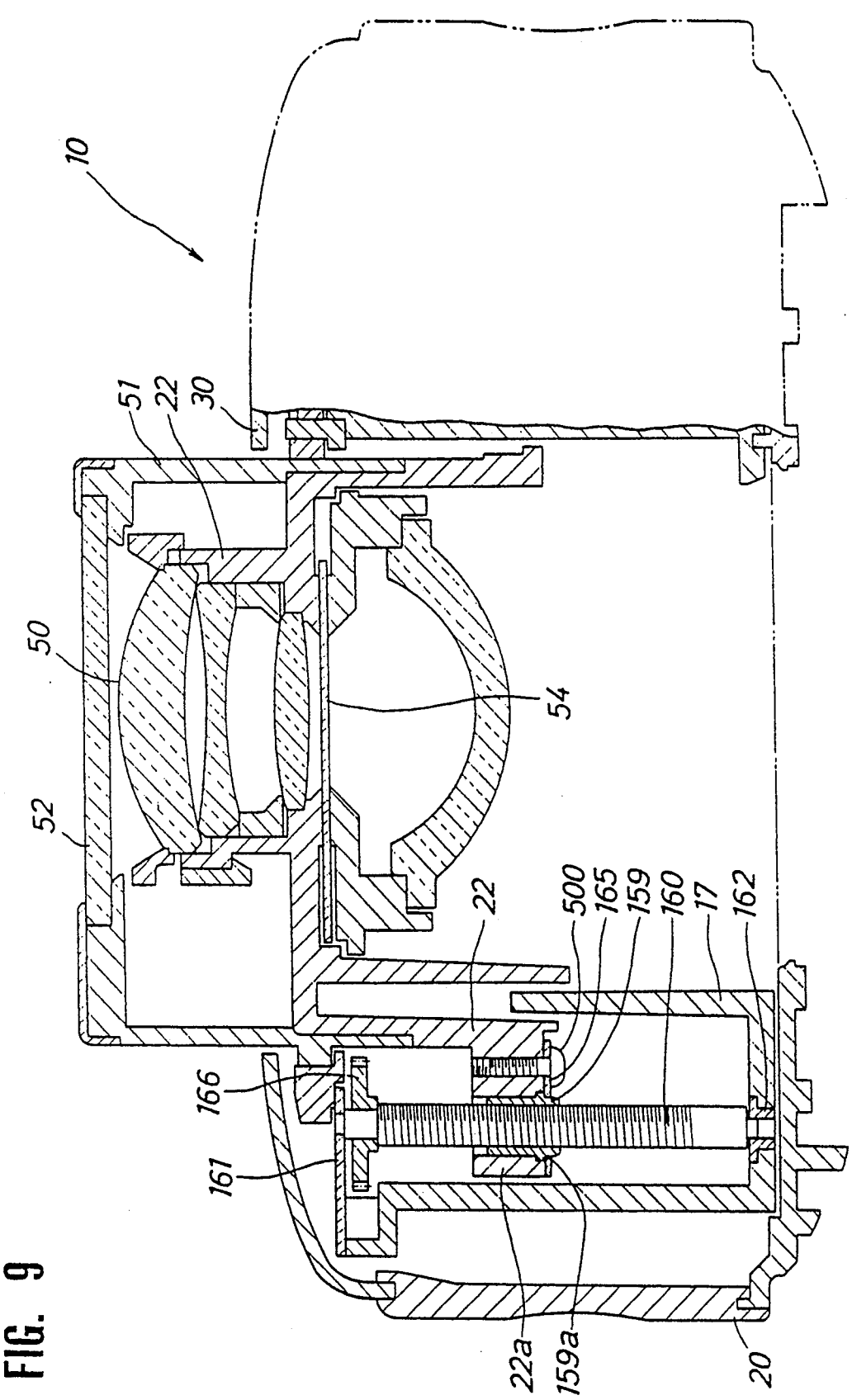
FIG. 9 is a sectional view taken along a line IX—IX of FIG. 8.
Figure 10:
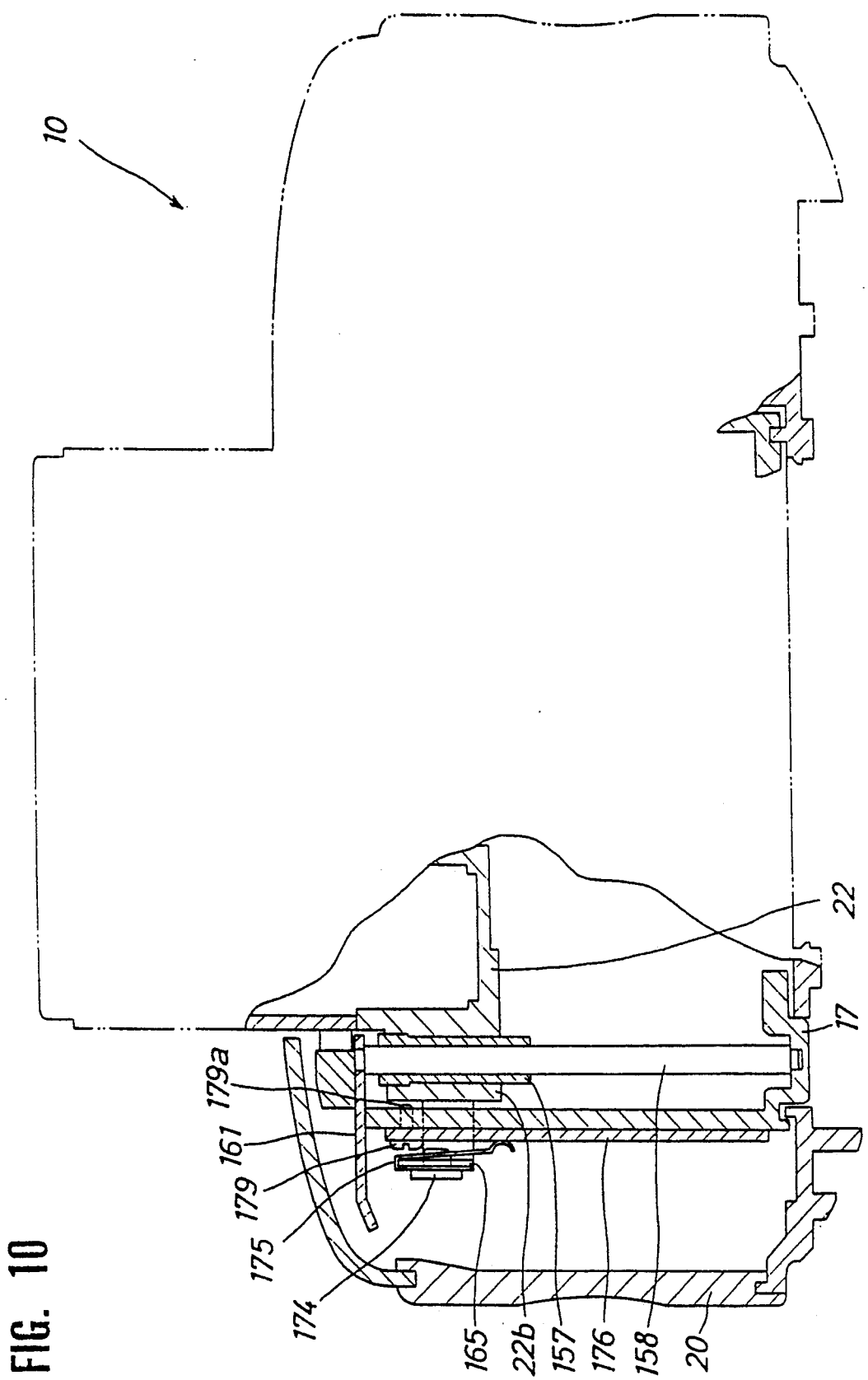
FIG. 10 is a sectional view taken along a line X—X of FIG. 8.
Figure 11:
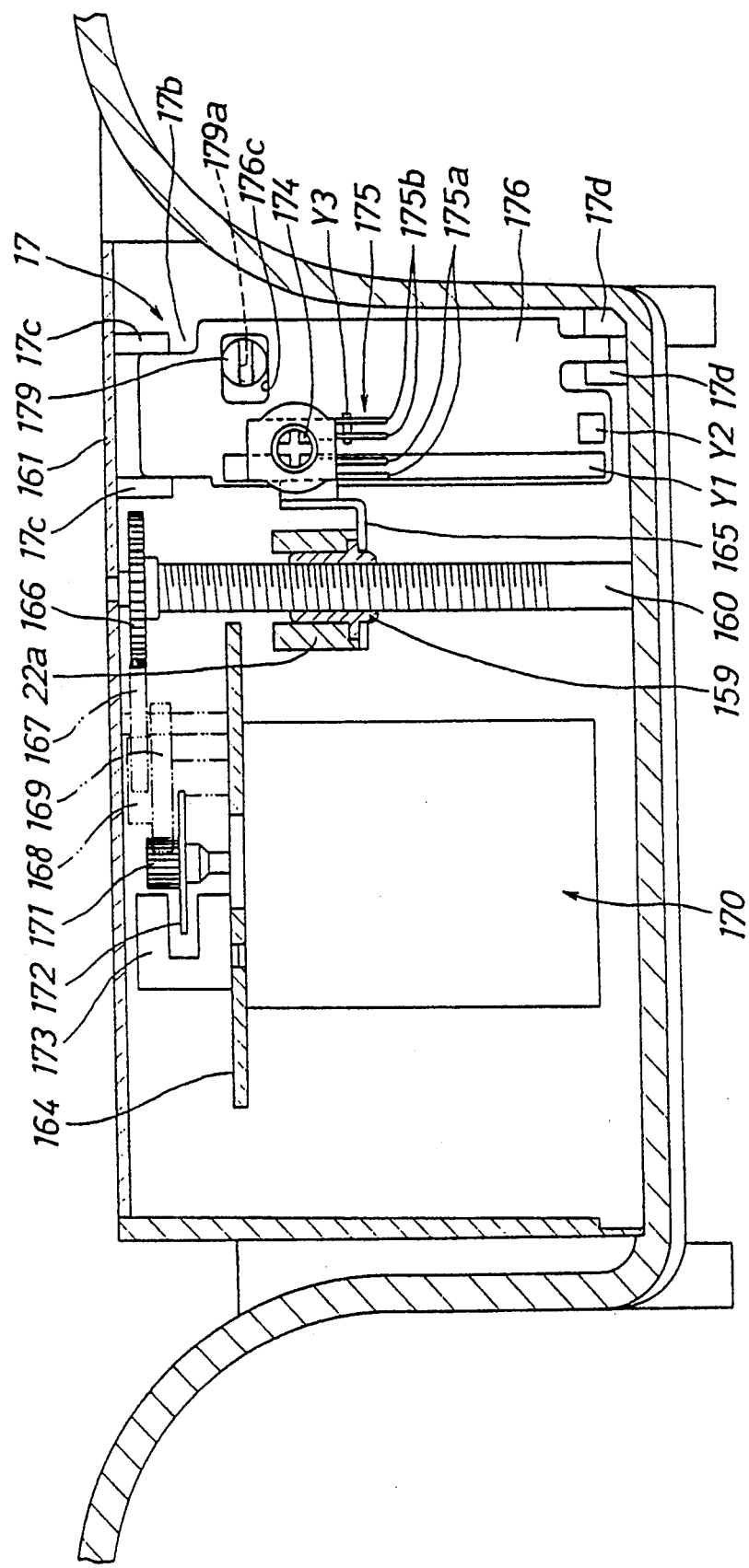
FIG. 11 is a sectional view taken along a line XI—XI of FIG. 8.

As shown in FIG. 8, the barrel 51 is arranged on the front base plate 17 so as to reciprocate in the optical axis direction, so that the barrel 51 moves between a housing position and a photographic position. The barrel frame 22 is fixed on the barrel 51 so that the two members integrally move. A support portion 22b formed at the lower end of the barrel frame 22 is slidably supported by a guide shaft 158 via a bearing 157 and is supported to be movable on a drive shaft 160 via a female thread bearing 159, as shown in FIG. 9. One end of the drive shaft 160 is rotatably supported by a support plate 161 fixed on the front base plate 17, and its other end is rotatably supported by the front base plate 17 via a bearing 162, as shown in FIG. 9. One end of the guide shaft 158 is fixed on a support plate 161, and its other end is fixed on a boss portion protruding to a film plane of the camera on the front base plate 17, and this boss portion is fitted to a hole arranged on the main body 10, as shown in FIG. 10. Therefore, the barrel frame 22 moves straight along the optical axis upon rotation of the drive shaft 160. And the linear movement of the barrel frame 22 is adapted to be in good straightness and parallelism to the optical axis, because length of the bearing 157 can be made longer and fitting length between the guide shaft 158 and the bearing 157 can be made longer, by fitting said boss portion to said hole arranged on the main body 10. Retraction of the lens barrel 51 to a nearer position to the film plane i.e. causing the housing position of the photographic lens 50 nearer to the film plane is made possible by this construction. Thus, housing problem of the photographic lens i.e. one of obstructive factors for miniaturization of camera is ingeniously resolved. In such a photographic lens drive mechanism, fixing the guide shaft 158 as nearer as possible to the optical axis is preferable for improving guide preciseness, in another aspect, length of the guide shaft 158 is required to be elongated to the direction of the film plane to put the photographic lens 50 nearer position to the film plane upon retraction as mentioned before. When the guide shaft is elongated to the direction of the photographic lens, interference will occur between one of its ends and the film plane, so there is a limit for elongation of the guide shaft. And the limit is made as strict as the guide shaft comes nearer to the optical axis. However, this construction is able to easily perform improvement of guiding preciseness and miniaturization of the camera in this limit.

The female thread bearing 159 is supported by a pressing plate 165 fixed on a support portion 22a of the barrel frame 22 by a machine screw 500, such that the pressing plate 165 prevents removal of the female thread bearing 159 from the barrel frame 22. In addition, both side surfaces of a flange portion 159a of the female thread bearing 159 forms a pair of parallel planes (not shown) and the flange portion 159a is fitted in the support portion 22a to prevent the rotation of the bearing 159.

A drive gear 166 is fitted on the drive shaft 160 and meshed with an output gear 171 of an AF motor 170 via intermediate gears 167, 168, and 169, as shown in FIG. 8. The gears 167, 168, and 169 and the AF motor 170 are supported by the support plate 161 and a base plate 164. When the AF motor 170 is driven, its power is transmitted to the drive gear 166 via the intermediate gears 167, 168, and 169 to rotate the drive shaft 160, thereby constituting a drive mechanism for moving the barrel 51 in the optical axis direction.

A rotary vane 172 formed by a propeller-like opaque member is fitted on a rotating shaft of the AF motor 170. The rotation amount of the rotary vane 172 is detected by a photointerruptor 173 to detect a moving amount of the barrel 51 in the optical axis direction. The photointerruptor 173 is a sensor element in which a light source and a photodetecting element are arranged to oppose each other and which changes output characteristics of the photodetecting element in accordance with whether the rotary vane 172 is present between the light source and the photodetecting element.

A contact piece 175 is fixed by a machine screw 174 on the pressing plate 165 fixed on the support portion 22a of the barrel frame 22. This contact piece 175 moves integrally with the barrel 51 to slide on a control board 176. A ground contact 175a and a position detection contact 175b are formed on the contact piece 175.

Figure 12:
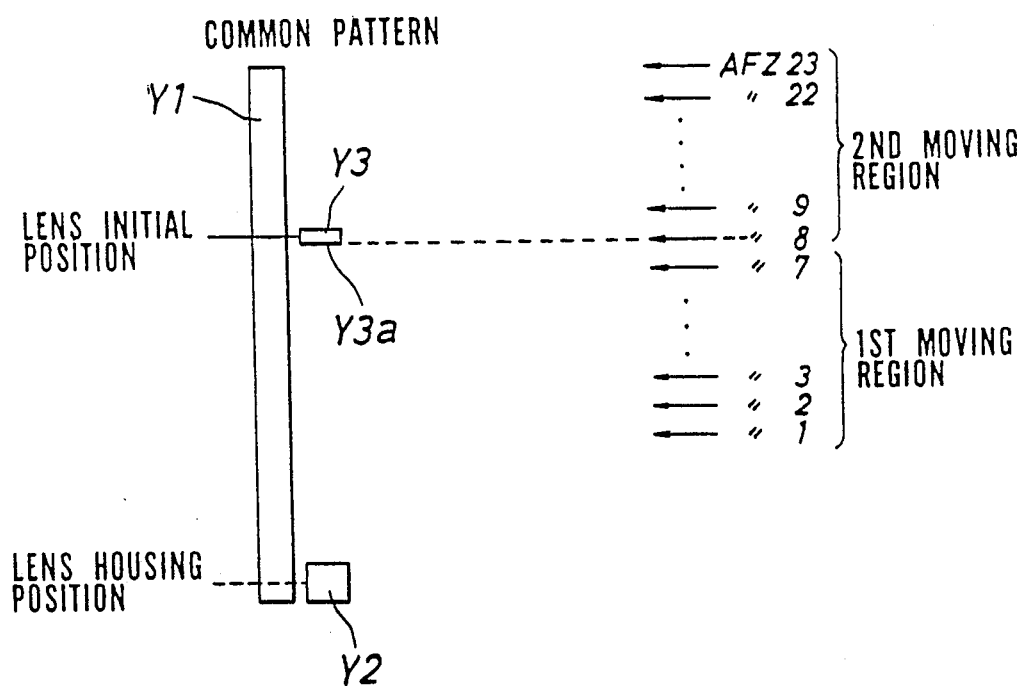
FIG. 12 illustrates a positional relation between conduction patterns on a control board, and they are a common pattern, a housing position pattern, and a reference position pattern.

The control board 176 is mounted on a wall 17b of the front base plate 17, and a common pattern Y1, a housing position pattern Y2, and a reference position pattern Y3 are formed on the control board 176, as shown in FIG. 12. In a photographing enable state, the reference position pattern Y3 constitutes an initial position setting means for moving the barrel 51 by a predetermined amount from a reference point to an initial position. An edge Y3a of the reference position pattern Y3 on the housing position pattern Y2 side is the reference point.

In the camera of this embodiment, in order to move the photographic lens within a short time period for photographing of an object at a closer distance, i.e., for so-called close-up photographing, and to widen a photographing distance range, the entire moving range of the photographic lens is divided into measured distance zones AFZ1 to AFZ23 such that a moving range of normal distance photographing is assigned to the measured distance zones AFZ1 to AFZ7, a moving range of a close-up photographing is assigned to the measured distance zones AFZ8 to AFZ23, and the reference point is set at the center of the measured distance zone AFZ8. Note that this arrangement in which the entire moving range of the photographic lens is divided into the 23 measured distance zones and the moving range of the normal distance photographing is assigned to the distance measurement zones AFZ1 to AFZ7 is not related to the essence of the present invention. That is, the entire moving range of the photographic lens can be divided into an arbitrary number of zones, and the moving range of the normal distance photographing can be arbitrarily assigned to either a smaller or larger number of measured distance zones AFZ. In addition, in the camera of this embodiment, on the basis of the empirical fact that the frequency of normal distance photographing is higher than that of close-up photographing in general photographing, a range from the measured distance zones AFZ1 to AFZ7, i.e., a moving range corresponding to the normal distance photographing is defined as a first moving region, and a range from the measured distance zones AFZ8 to AFZ23, i.e., a moving range corresponding to the close-up photographing is defined as a second moving region. However, this arrangement is not essential division, and the moving range corresponding to the normal distance photographing may be defined as the second moving region while that corresponding to the close-up photographing is defined as the first moving region. The measured distance zone will be referred to as an AFZ hereinafter.

Information indicating that the photographic lens being at the housing position, or indicating that the photographic lens being at the initial position is given to the controller by means of the housing position pattern Y2 or the reference position pattern X3, thereby the controller detects the position of the photographic lens 50. Two end portions of the control board 176 are engaged with projecting portions 17c and 17d of the front base plate 17 and supported to be movable along the optical axis. A position adjust window 176c is formed in the control board 176, and an adjust bolt 179 is threadably engaged with the wall 17b of the front base plate 17 through the position adjust window 176c. A mount shaft 179a of the adjust bolt 179 is located at a position shifted from the center of the bolt head portion, and the control board 176 is moved in the optical axis direction by rotating the adjust bolt 179.

When the control board 176 is moved in this manner, the position of the reference position pattern Y3 is changed to perform focusing adjustment. Therefore, the reference point of the reference position pattern Y3, the position of which can be adjustable, can be used in focusing adjustment of the photographic lens upon camera assembly.

As shown in FIG. 8, a shutter drive mechanism and the like are arranged in the barrel 51. After the release switch S2 is switched on by an operation of the release button 2 and the barrel 51 is moved to the in-focus position, a shutter motor 80 is started, and its power is transmitted from an output gear 81 to a toothed portion 86a of a shutter ring 86 via intermediate gears 82, 83, 84, and 85 to rotate the shutter ring 86, thereby opening and closing of three shutter blades 54c is made. The shutter blades 54c are pivotally supported by the barrel 51 via support pins 87. An engagement slot 54a is formed in the end portion of each shutter blade 54c, and an operation pin 88 fixed on the shutter ring 86 is engaged with the engagement slot 54a. Therefore, the shutter blades 54c are opened and closed by a rotation of the shutter ring 86.

The shutter ring 86 is set such that its projection 86b is arranged to contact with a stopper 89a fixed on the barrel 51 side. A stopper 89b serves as a position regulating member upon shutter opening operation.

An end piece 54b is formed on the shutter blade 54c. A photointerruptor 99 detects the end piece 54b to check opening and closing of the shutter and detect an abnormal operation of the shutter. Note that the photointerruptor 99 can also control a shutter speed.

Operation of Optical System Drive Mechanism

An operation of the optical system drive mechanism of this camera will be described below with reference to FIGS. 13 to 16.

Figure 13:
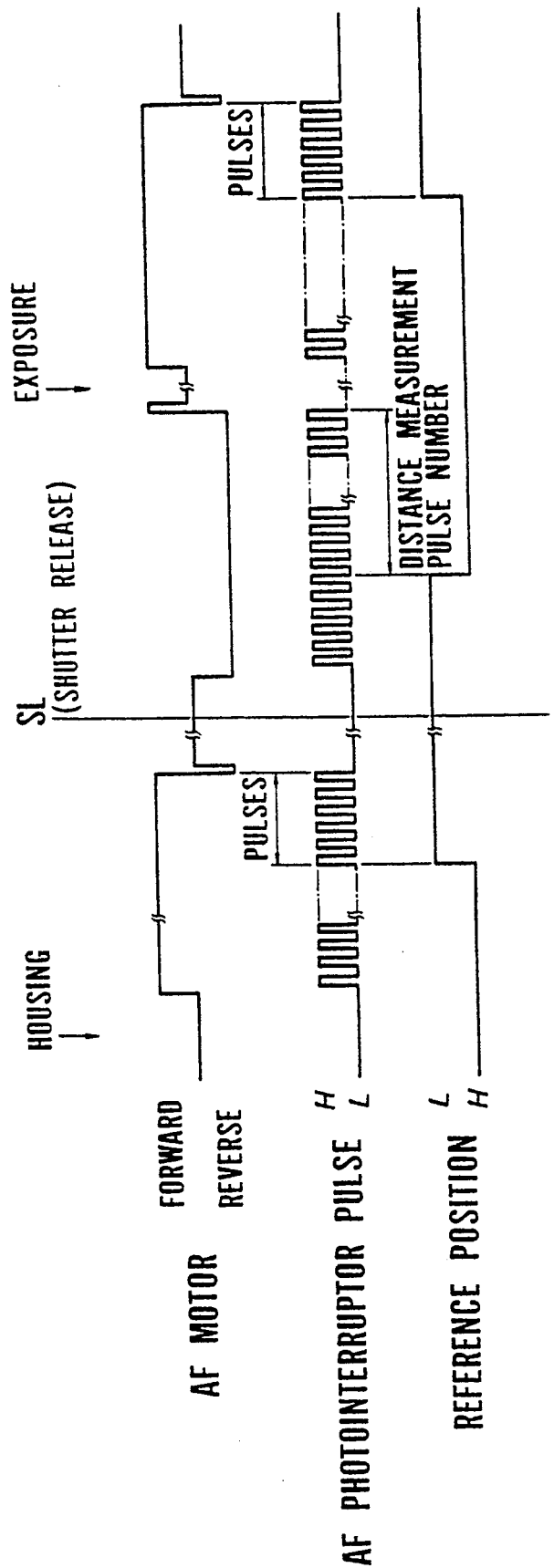
FIG. 13 is a timing chart for explaining an operation performed when an object distance is larger than a predetermined distance.
Figure 14:
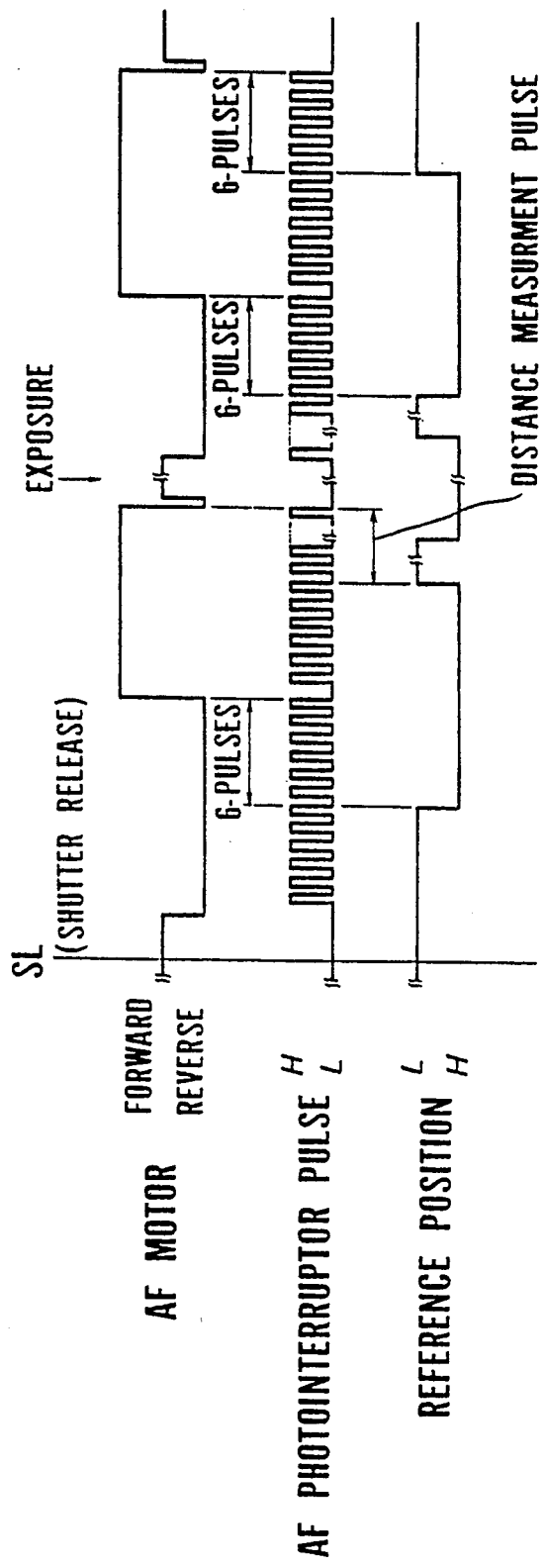
FIG. 14 is a timing chart for explaining an operation performed when an object distance is smaller than the predetermined distance.
Figure 15:
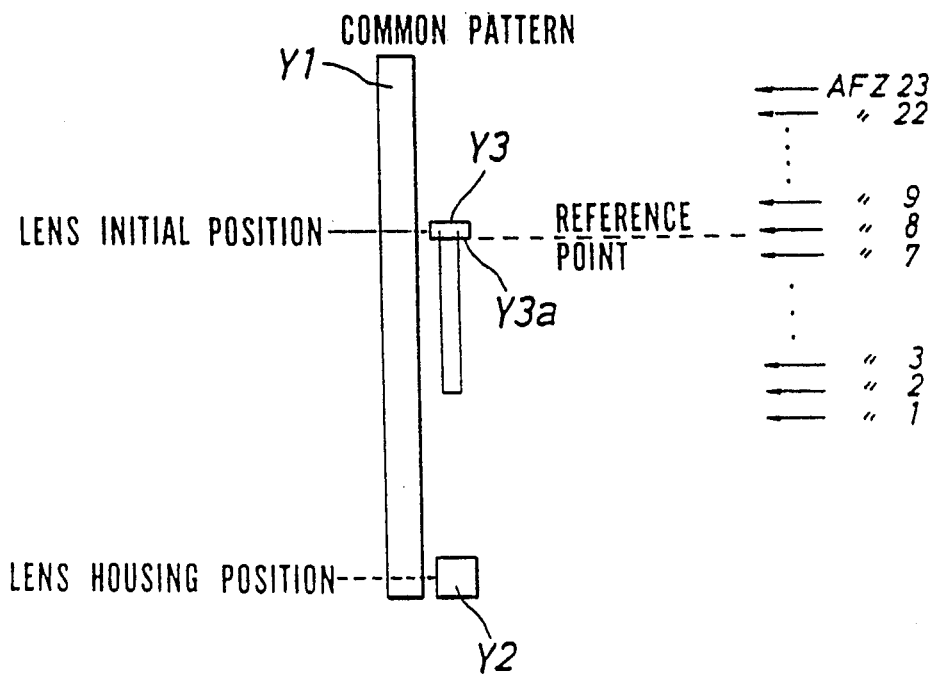
FIG. 15 illustarates an operation of a contact piece performed when an object distance is larger than the predetermined distance.
Figure 16:
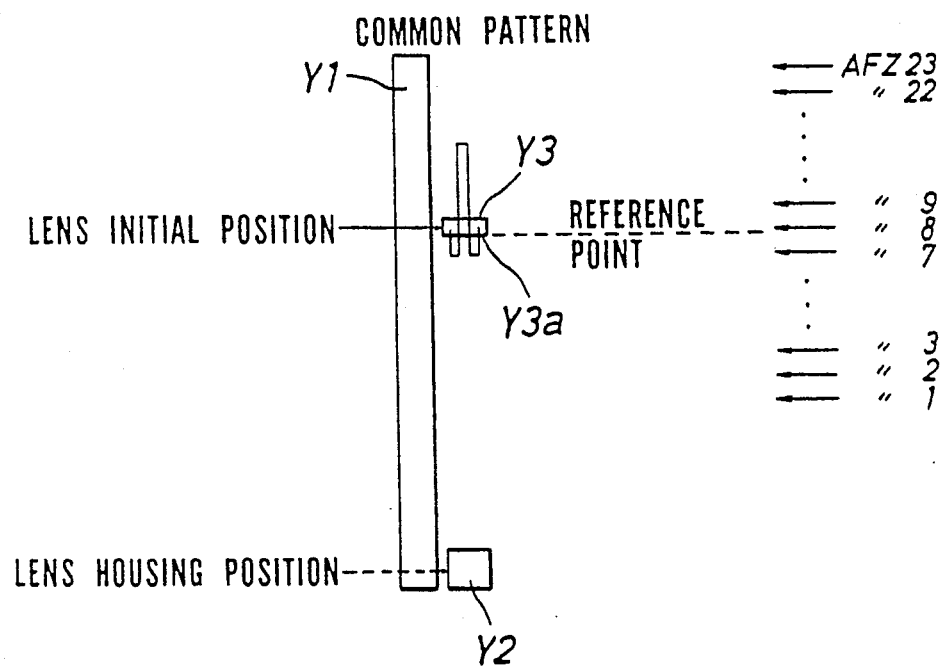
FIG. 16 illustrates an operation of a contact piece performed when an object distance is smaller than the predetermined distance.
Figure 17A:
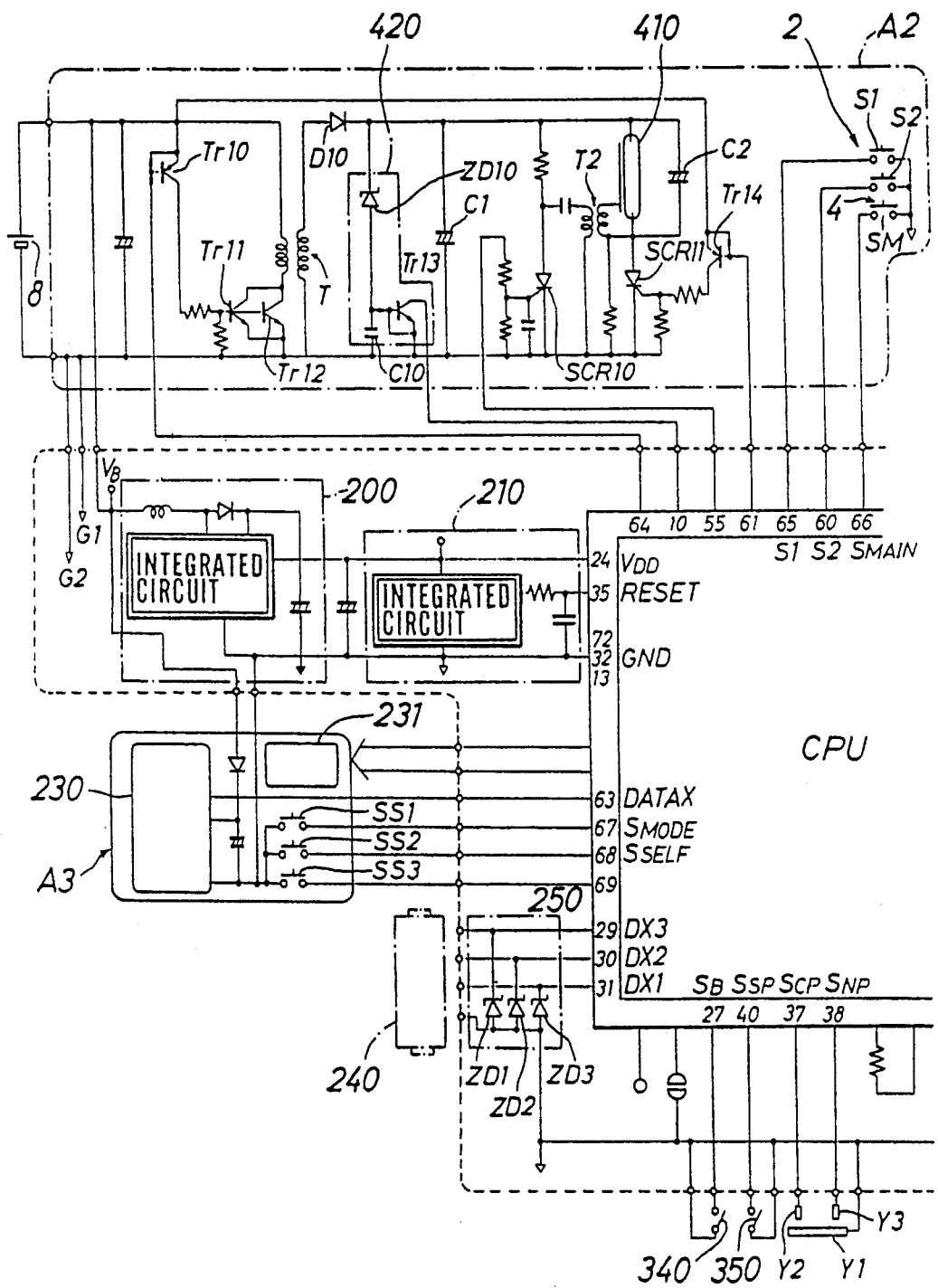
FIGS. 17A and 17B are circuit diagrams together showing a controller of a camera to which the present invention is applied.
Figure 17B:
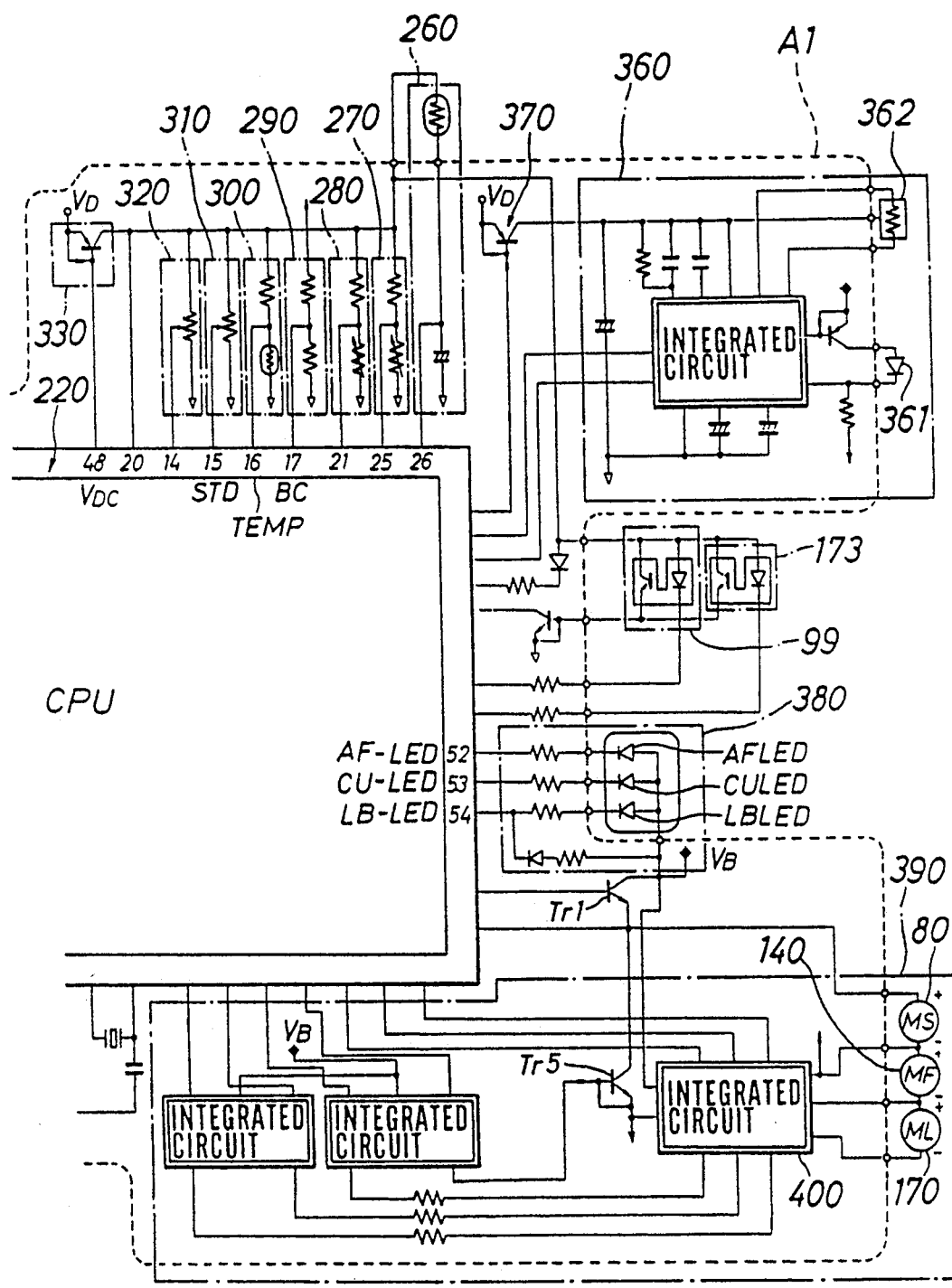

FIG. 13 is a timing chart for explaining an operation performed when an object distance is larger than the predetermined distance, FIG. 14 is a timing chart for explaining an operation performed when an object distance is smaller than the predetermined distance, FIG. 15 is illustrating an operation of the contact portion performed when an object distance is larger than the predetermined distance, and FIG. 16 is illustrating an operation of the contact portion performed when an object distance is smaller than the predetermined distance.

The camera of this embodiment is activated when the main switch button 4 is operated, and the AF motor 170 rotates forward to extend the barrel 51, thereby extending the barrel 51 from the housing position. In synchronism with rotation of the rotary vane 172 by the AF motor 170, the photointerruptor 173 outputs pulses. When the barrel 51 is extended and the edge Y3a of the reference position pattern Y3 is detected by the position detection contact 175b of the contact piece 175, power in the reverse direction is supplied to the AF motor 170 for a predetermined time period after the photointerruptor 173 outputs six pulses, for example, from the reference point passing moment, thereby braking and stopping the AF motor 170. A means for setting the initial position of the photographic lens 50 in the second moving region near the reference point before focusing drive is started, is provided as an initial position setting means. When the barrel 51 is stopped, the position detection contact 175b is stopped at a substantially central portion of the reference position pattern Y3, and this stop position is the initial position. In this initial position, the camera waits until a release switch S1 is switched on by an operation of the release button 2. The AF motor 170 is stopped after six pulses are counted from the reference point of the edge Y3a in order to stop the position detection contact 175b at substantially the central portion of the reference position pattern Y3. Since the position detection contact 175b is stopped at substantially the central portion of the reference position pattern Y3, the position detection contact 175b does not fall outside the reference position pattern Y3 even if an external force is applied on the barrel 51, thereby preventing an erroneous operation in moving control of the photographic lens 50.

The release switch S1 is switched on in an initial stroke of depression of the release button 2, and the release switch S2 is switched on in the subsequent stroke. When the release switch S1 is switched on, photographic preparation operations such as distance measurement for measuring a distance to an object to be photographed and photometering for measuring the brightness of the object to be photographed are performed. When the release switch S2 is switched on, focusing control of the photographic lens 50 is performed, and then operations during and after photographing such as opening and closing of the shutter, initial position returning of the photographic lens, and winding of a film are performed.

In the AFZs 1 to 7 of normal distance photographing, photographing of an object being from a close distance to an infinite distance (this range is called a normal photographic range) can be performed. In the AFZs 8 to 23 of close-up photographing, photographing of an object being from a closest distance to the close distance (this range is called a close-up photographic range) can be performed. That is, the normal and close-up photographic ranges are continuous.

Therefore, when the release switch S1 is switched on to perform the photographing preparation operations such as distance measurement for measuring a distance to an object and photometering for measuring the brightness of the object and the release switch S2 is subsequently switched on, if object distance information corresponds to the AFZs 1 to 7, the AF motor 170 is powered in the reverse direction to move the photographic lens 50 in a direction of retracting the lens into the main body, as shown in FIGS. 13 and 15. At this time, after the position detection contact 175b passes the edge Y3a of the reference position pattern Y3, the number of moving pulses from the photointerruptor 173 is counted. When the count reaches a predetermined number, the AF motor 170 is braked by power supply in the forward direction, and the power supply is stopped to stop the photographic lens 50. In this manner, the photographic lens 50 is moved from the initial position through the reference point, focusing is performed on the basis of the reference point, and the shutter opening and closing operation is performed after the lens is stopped.

Thereafter, the AF motor 170 is powered in the forward direction to move the photographic lens 50 in the extending direction, but no pulse is counted at this time. When the position detection contact 175b passes the edge Y3a of the reference position pattern Y3, six pulses, for example, are counted from the reference point, and the AF motor 170 is braked and stopped by power supply in the reverse direction in the same manner as described above. Thereafter, post-photographing process such as film winding is performed, and the camera waits in the initial state until the release switch S1 is switched off. When the release switch S1 is switched off, a standby state is set, and the camera waits until the main switch button 4 or the release button 2 is depressed again.

On the other hand, when the release switch S1 is switched on to perform the photographing preparation operations such as distance measurement for measuring a distance to an object to be photographed and photometering for measuring the brightness of the object to be photographed and the release switch S2 is subsequently switched on, if object distance information corresponds to the AFZs 8 to 23, the AF motor 170 is powered in the reverse direction to move the photographic lens 50 in the direction of retracitng the lens into the main body. At this time, when the position detection contact 175b passes the edge Y3a of the reference position pattern Y3 and six pulses, for example, are counted from the reference point, the AF motor is powered in the forward direction to move the photographic lens 50 in the extending direction. When the position detection contact 175b passes the edge Y3a of the reference position pattern Y3 again, the number of moving pulses is counted from the reference point. When the count reaches a predetermined number, the AF motor 170 is braked by power supply in the reverse direction, and the power supply is stopped to stop the barrel 51. In this manner, the barrel 50 is moved in the opposite direction from the initial position through the reference point and caused to pass the reference point again, focusing is performed from the reference point, and then the opening/closing operation of the shutter is performed.

Thereafter, the AF motor 170 is powered in the reverse direction to move the barrel 51 in the retracting direction, but no pulse is counted at this time. When the position detection contact 175b passes the edge Y3a of the reference position pattern Y3, six pulses, for example, are counted immediately after the contact 175b passes the edge Y3a and the AF motor 170 is powered in the forward direction to move the barrel 51 in the extending direction. When the position detection contact 175b passes the edge Y3a of the reference position pattern Y3 again, six pulses, for example, are counted from the reference point, and the AF motor 170 is braked and stopped by power supply in the reverse direction and the power supply is stopped to stop the barrel 51, as in the same manner as described above. Thereafter, the post-photographing process such as film winding is performed, and the camera waits in the initial state until the release switch S1 is switched off. When the release switch S1 is switched off, the camera is set in the standby state to wait until the main switch button 4 or the release button 2 is depressed again.

As described above, within the moving ranges of normal and close-up photographing, the barrel 51 is moved from the reference point in one direction by a predetermined amount and stopped at the initial position. When the distance measurement information corresponds to the normal distance photographing range, the barrel 51 is moved from the initial position through the reference point, focusing is performed from the reference point on the basis of the distance measurement information, and the barrel 51 is returned to the initial position after photographing. When the distance measurement information corresponds to the close-up photographing range, the barrel 51 is moved from the initial position through the reference point and then moved in the opposite direction to pass the reference point again, focusing is performed from the after mentioned reference point passing moment, and the barrel 51 is returned to the initial position after photographing.

Therefore, the extending amount of the photographic lens 50 during photographing is decreased to realize a quick extending operation. In addition, since an extending amount for focusing is set on the basis of the same reference point in both the normal distance photographing and the close-up photographing, precision of the extending amount of the photographic lens 50 can be easily performed. Furthermore, no error is caused because the same reference position is used.

Moreover, the initial position is set within one of the moving ranges of normal distance photographing and close-up photographing, the barrel 51 is stopped at this initial position, and the photographic lens 50 is moved from the initial position on the basis of the distance measurement information. Therefore, the normal distance photographing and the close-up photographing can be performed without causing a photographer to perform any specific operation.

In this embodiment, the initial position setting means for moving the photographic lens 50 from the reference point by a predetermined amount and stopping it at the initial position is constituted by the contact piece and the patterns of the control board. However, the initial position setting means may be arranged such that a photointerruptor is mounted on the front base plate 17 and a opaque member is mounted on the barrel 51 so that the opaque member enters between a light source and a photodetecting element of the photointerruptor at a position of the reference point.

Controller of Camera

The controller of this camera has a main package unit A1, a strobe unit A2, and a date module A3, all of which are applied with a drive voltage from the lithium battery 8. A constant-voltage circuit 200 is used in the main package unit A1 to apply a predetermined drive voltage to a CPU 220 via a reset circuit 210 and to the date module A3.

The date module A3 includes a date superposing circuit 230, a photographic information display circuit 231, a strobe mode switch button SS1, a self-timer switch SS2, and a film rewind switch SS3. The CPU 220 outputs a date superpose signal and a display command signal to the date superposing circuit 230 and the photographic information display circuit 231, respectively, and receives switch information.

The CPU 220 is connected to a DX detector 250 for detecting a DX code of a patrone 240 of a DX film. Zener diodes ZD1 to ZD3 included in the DX detector 250 absorb an electrostatic surge.

The CPU 220 is connected to a main switch SM which is switched on or off by the main switch button 4 and to the release switches S1 and S2 which are switched on or off by the release button 2. The CPU 220 is operated when the main switch button 4 is depressed to switch on the main switch SM or the release button 2 is depressed to switch on the release switch S1.

The CPU 220 is connected to a photometering circuit 260 for obtaining photometering information, a photometry adjusting circuit 270, a shutter drive level adjusting circuit 280, a battery check circuit 290 for obtaining remaining amount information BC of a battery, a temperature correcting circuit 300 for obtaining temperature information TEMP for temperature compensation of a shutter drive unit, a shutter opening time correcting circuit 310 for obtaining shutter trigger delay time information STD for correcting opening of a shutter, and a distance measurement level adjusting circuit 320, all of which are applied with a drive voltage through a power supply switch 330.

The CPU 220 receives switch information from a switch 340 for detecting an open and close state of the back cover and a film frame moving amount detection switch 350. The CPU 220 also receives position information of the photographic lens 50 from the housing position pattern Y2 and the reference position pattern Y3.

An AF unit 360 connected to the CPU 220 is applied with a drive voltage by a power supply switch 370. A light-emitting element 361 and a position sensitive element 362 such as a PSD are included in the AF unit 360 to supply distance measurement information as an analog signal. The No. NAFZ of measured distance zones (AFZs) is determined in accordance with the distance measurement information. If the No. falls within the photographic enable distance range, an AFLED of an LED unit 380 is turned on under the intrafinder indication control of the CPU 220. A CULED is turned on in a close-up photographic mode, and an LBLED is turned on when the brightness of an object to be photographed is less than or equal to a predetermined level in an automatic flash mode.

When the release switch S2 is switched on, the CPU 220 controls a motor driver 390 to drive the AF motor 170 on the basis of the distance measurement information. The AF motor 170 extends the barrel 51 and stops it at a predetermined position. The motor driver 390 drives a shutter motor 80 and a film feed motor 140 in addition to the AF motor 170.

Figure 18:
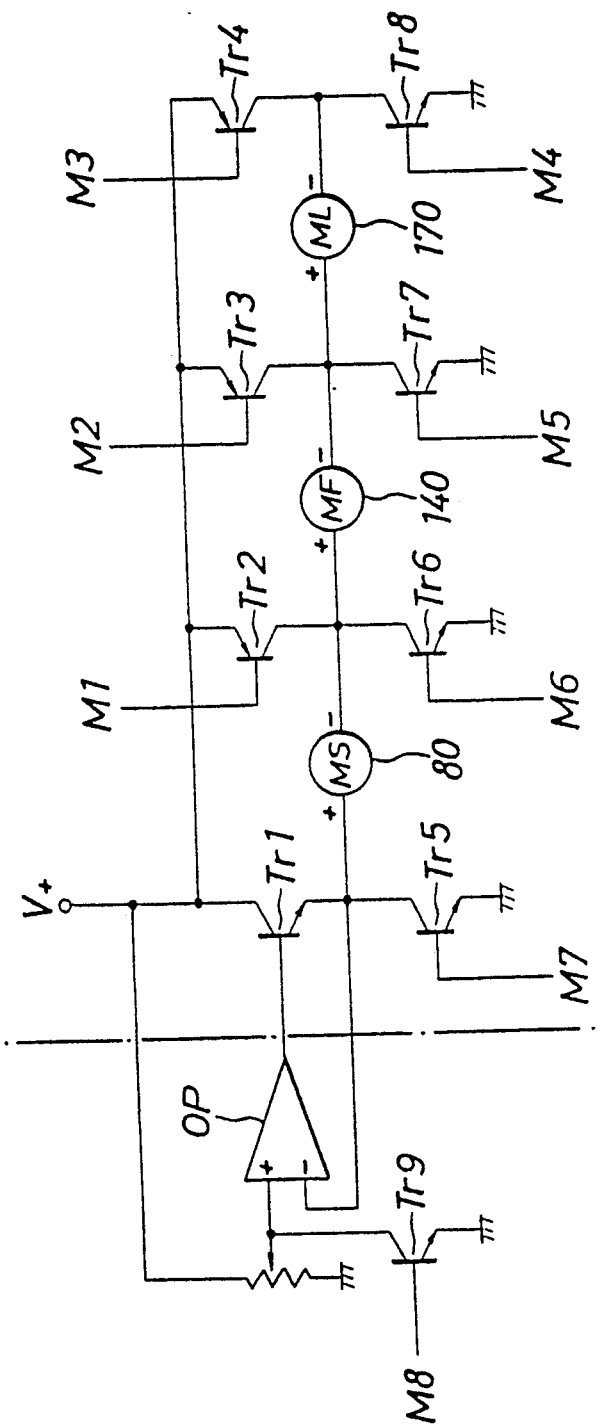
FIG. 18 is a circuit diagram showing a motor driver in detail.

In the motor driver 390, as shown in FIG. 18, an operational amplifier OP and a transistor Tr9 are incorporated on the side of the CPU 220, and an integrated circuit 400 incorporates transistors Tr2 to Tr4 and Tr6 to Tr8. In order to open the shutter, the transistor Tr9 is turned off, and an adjusted constant voltage is applied to the plus input terminal of the operational amplifier OP. Therefore, the operational amplifier OP and a transistor Tr1 apply the constant voltage to the plus terminal of the shutter motor 80. In addition, when the transistor Tr6 is turned on, a constant current flows from the plus to minus terminal of the shutter motor 80. Therefore, the shutter motor 80 can be stably driven regardless of a variation in power source voltage to stably rotate so as to open the shutter. In addition, since the control is performed using the constant voltage, the shutter opening operation can be easily controlled.

To close the shutter, the transistors Tr2 and Tr5 are turned on. As a result, the shutter is rapidly closed.

The transistors Tr3 and Tr8 are turned on for the forward rotation of the AF motor 170, and the transistors Tr4 and Tr7 are turned on for its reverse rotation.

The transistors Tr2 and Tr7 are turned on for the forward rotation of the film feed motor 140, and the transistors Tr3 and Tr6 are turned on for its reverse rotation.

The photographic lens 50 is moved upon driving of the AF motor 170, and the position control of the photographic lens 50 is performed in accordance with trigger information output when the position detection contact 175b of the contact piece 175 is brought into contact with the housing position pattern Y2 or the reference position pattern Y3 of the control board 176, and in accordance with moving amount information of the lens 50 given by the photointerruptor 173.

In accordance with photometering information AV, shutter motor control is performed to drive the shutter motor 80, and the shutter motor 80 operates the shutter 54 to expose a film. At this time, the photointerruptor 99 detects opening and closing of the shutter 54.

When the exposure is finished, the photographic lens 50 is returned to the initial position, and the motor driver 390 is controlled to drive the film feed motor 140, thereby winding the film. At this time, whether the film is wound by one frame is checked by reading out switch information from the film frame moving amount detection switch 350.

A transistor Tr10 of the strobe unit A2 is switched by a signal output at a predetermined frequency from a terminal CHG of the CPU 220. The signal output is amplified by transistors Tr11 and Tr12 to flow a current to the primary side of a transformer T and generate an AC having a predetermined voltage at the secondary side thereof. This AC output is rectified into a DC output by a diode D10 to charge capacitors C1 and C2 constituting a charge capacitor 7. A flashbulb 410 is caused to flash by discharge of the capacitors C1 and C2.

The diode D10 is connected to a voltage detection circuit 420 constituted by a Zener diode ZD10, a capacitor C10, and a transistor Tr13. The transistor Tr13 is applied with a predetermined voltage from a terminal FUL of the CPU 220. In the voltage detection circuit 420, if the application voltage to the capacitors C1 and C2 becomes a predetermined voltage or more, the Zener diode ZD10 is powered to turn on the transistor Tr13, and the terminal FUL is set at "L". Therefore, the CPU 220 detects that the charged capacity reaches a predetermined value or more and stops the charging.

Power for operating the flashbulb 410 is supplied by capacitor C2 or the capacitors C1 and C2. Whether the capacitor C2 is to be used or the capacitor C1 and C2 are to be used is determined on the basis of the distance measurement information and the photometering information, thereby a strobe light emission amount switching is performed.

In order to activate the flashbulb 410, a thyristor SCR 10 is turned on by an output signal from a terminal EFX of the CPU 220 to flow a current from a capacitor connected between the thyristor SCR 10 and a primary side of a transformer T2. As the result, the voltage at a secondary side of the transformer T2 is applied to a trigger pole of the flashbulb 410 to cause it to flash.

When a normal strobe light amount is required, only the capacitor C2 is discharged through the before-mentioned strobe light emitting process. However, when an increased strobe light amount is required, a thyristor 11 is turned on through switching on a transistor 14 by an output signal from a terminal CONT of the CPU 220. Then, before-mentioned strobe light emission process is performed, and the strobe light amount is increased, through synchronized discharge of the capacitors C1 and C2.

Optical System Drive Sequence of Camera

FIGS. 19 to 25 are flow charts for driving the optical system of the camera according to the present invention.

Figure 19:
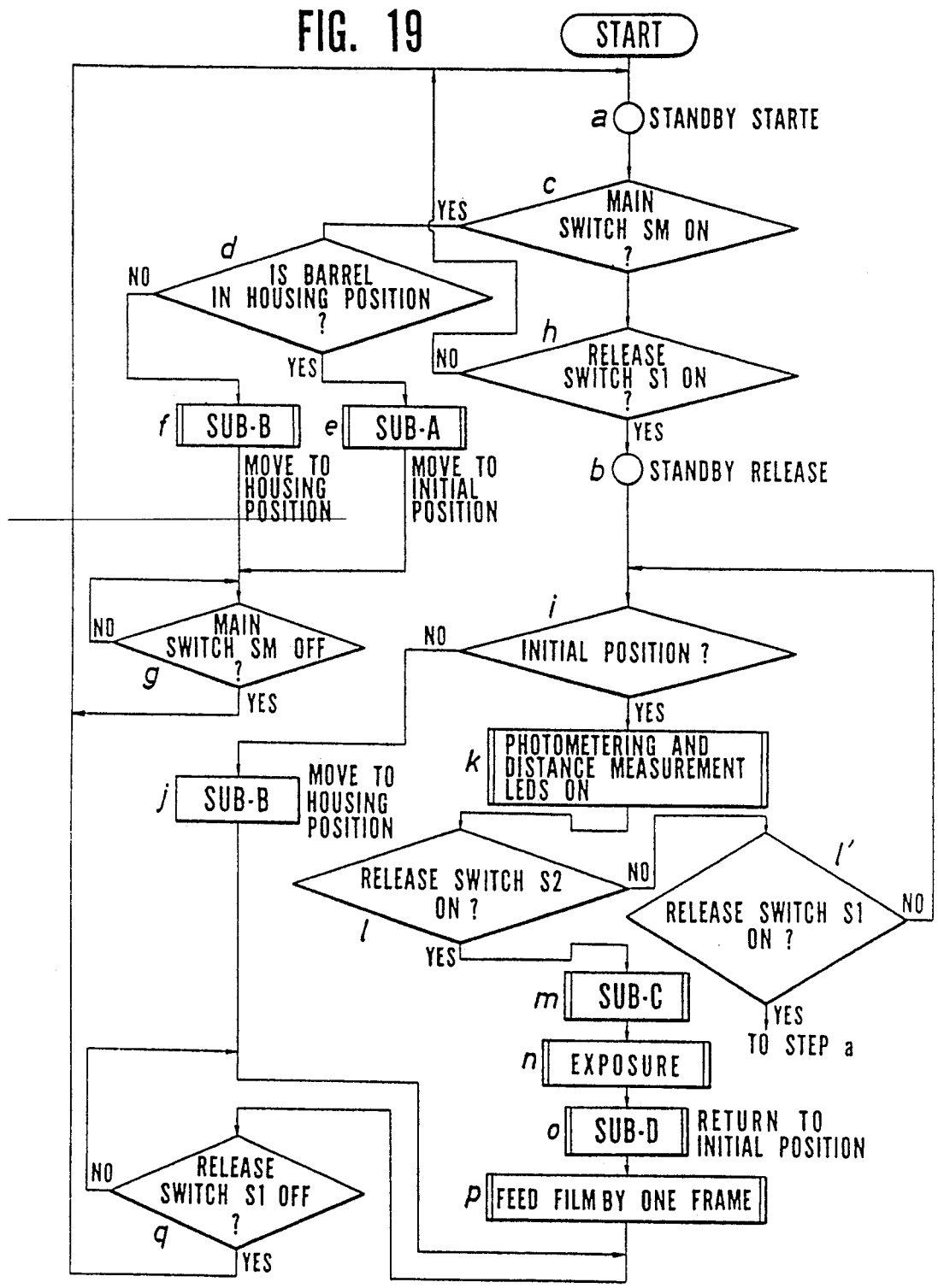

FIG. 19 shows a main flow chart.

When a battery and a film are set and no manipulation is performed, the camera is in a standby state (step a), and the CPU 220 is in a waiting state. When the main switch button 4 or the release button 2 is depressed to switch on the main switch SM or the release switch S1, the standby state is released (steps b and b'), and the CPU 220 is operated.

Whether the main switch SM is switched on is checked (step c). When the main switch SM is on in step c, whether the barrel 51 is in a housing position is checked (step d). When the barrel 51 is in the housing position in step d, a subroutine SUB-A is executed to move the barrel 51 to an initial position (step e).

When the barrel 51 is not in the housing position in step d, a subroutine SUB-B is executed to move the barrel 51 to the housing position (step f).

In this manner, the subroutine SUB-A or SUB-B is executed, and the flow waits until the main switch SM is switched off in step g. When the main switch SM is switched off, the flow returns to step a, and the camera is returned to the standby state. When the release button 2 is depressed and the release switch S1 is switched on in step h, whether the barrel 51 is in the initial position is checked (step i). When the barrel 51 is not in the initial position in step i, the subroutine SUB-B is executed to move the barrel 51 to the housing position (step j), and the flow waits until the release switch S1 is switched off (step g). When the release switch S1 is switched off, the flow returns to step a to set the camera in the standby state.

When the barrel 51 is in the initial position in step i, photometering, distance measurement, LED indication, and the like are performed (step k), and the flow waits until the release switch S2 is switched on or the release switch S1 is turned off while the release switch S2 is kept off (steps l and l'). When the release switch S2 is switched on, a subroutine SUB-C is executed to move the barrel 51 to an in-focus position (step m).

When the subroutine SUB-C is executed, the barrel 51 is moved from the initial position to the in-focus position on the basis of the distance measurement information, and the shutter is operated to perform exposure (step n).

Subsequently, a subroutine SUB-D is executed to move the barrel 51 from the in-focus position to the initial position in step o, the film F is fed by one frame (step p), and the flow waits until the release switch S1 is switched off (step g). When the release switch S1 is switched off, the flow returns to step a to set the camera in the standby state as described above. Similarly, when the release switch S1 is switched off in step l', the flow returns to step a to set the camera in the standby state.

Figure 20:
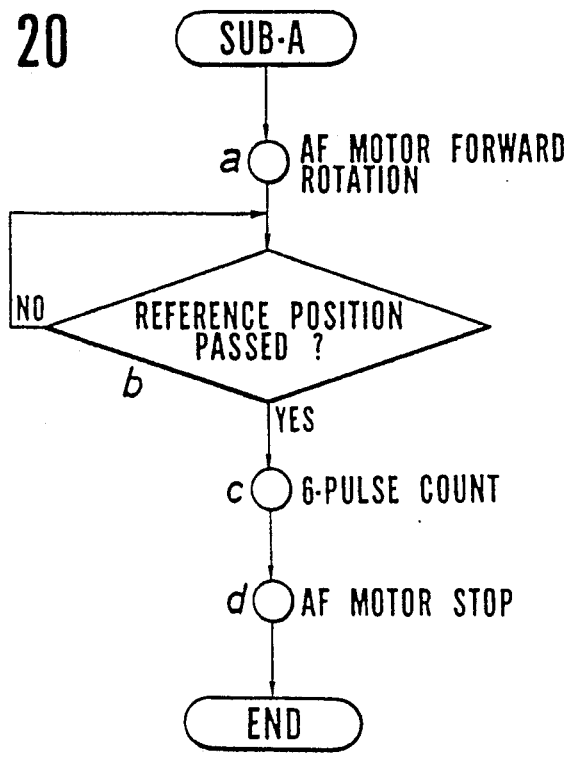

FIG. 20 is a flow chart showing a subroutine for moving the photographic lens from the housing position to the initial position.

In this subroutine SUB-A, the AF motor 170 is rotated forward in the extending direction (step a), and the flow waits until the position detection contact 175b passes the reference point of the edge Y3a of the reference position pattern Y3 (step b). When a rise signal of the edge Y3 is input, a count operation is started in accordance with the signal to count, e.g., six output pulses from the photointerruptor 173 (step c), and the AF motor 170 is stopped to keep the barrel 51 at the initial position (step d).

Figure 21:
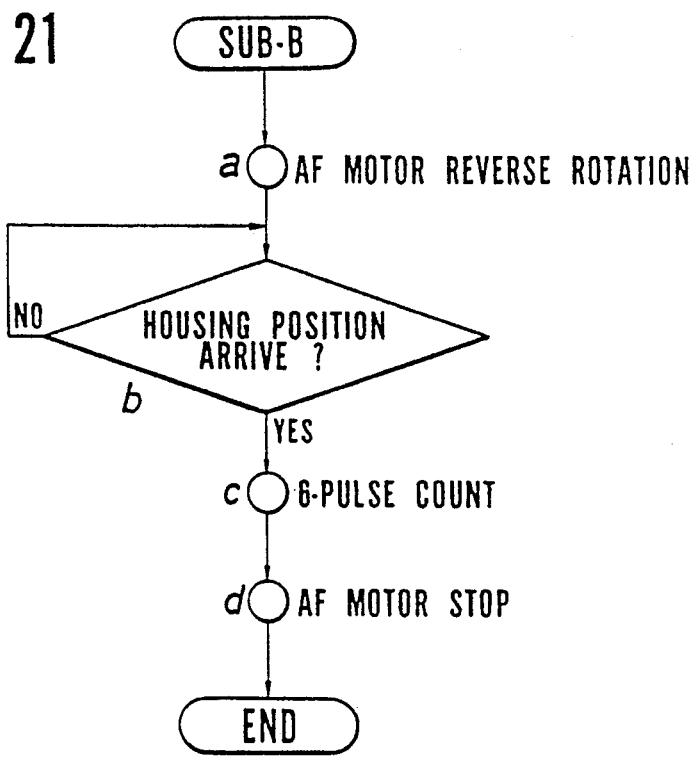

FIG. 21 is a flow chart showing a subroutine for moving the photographic lens from the initial position to the housing position.

In this subroutine SUB-B, the A motor 170 is reversely rotated in the retracting direction (step a), and the position detection contact 175b waits until a rise signal from the edge of the housing position pattern Y2 is received (step b). When the rise signal is input from the edge, six output pulses, for example, from the photointerruptor 173 are counted (step c), and the AF motor 170 is stopped to keep the barrel 51 at the housing position (step d).

Figure 22:
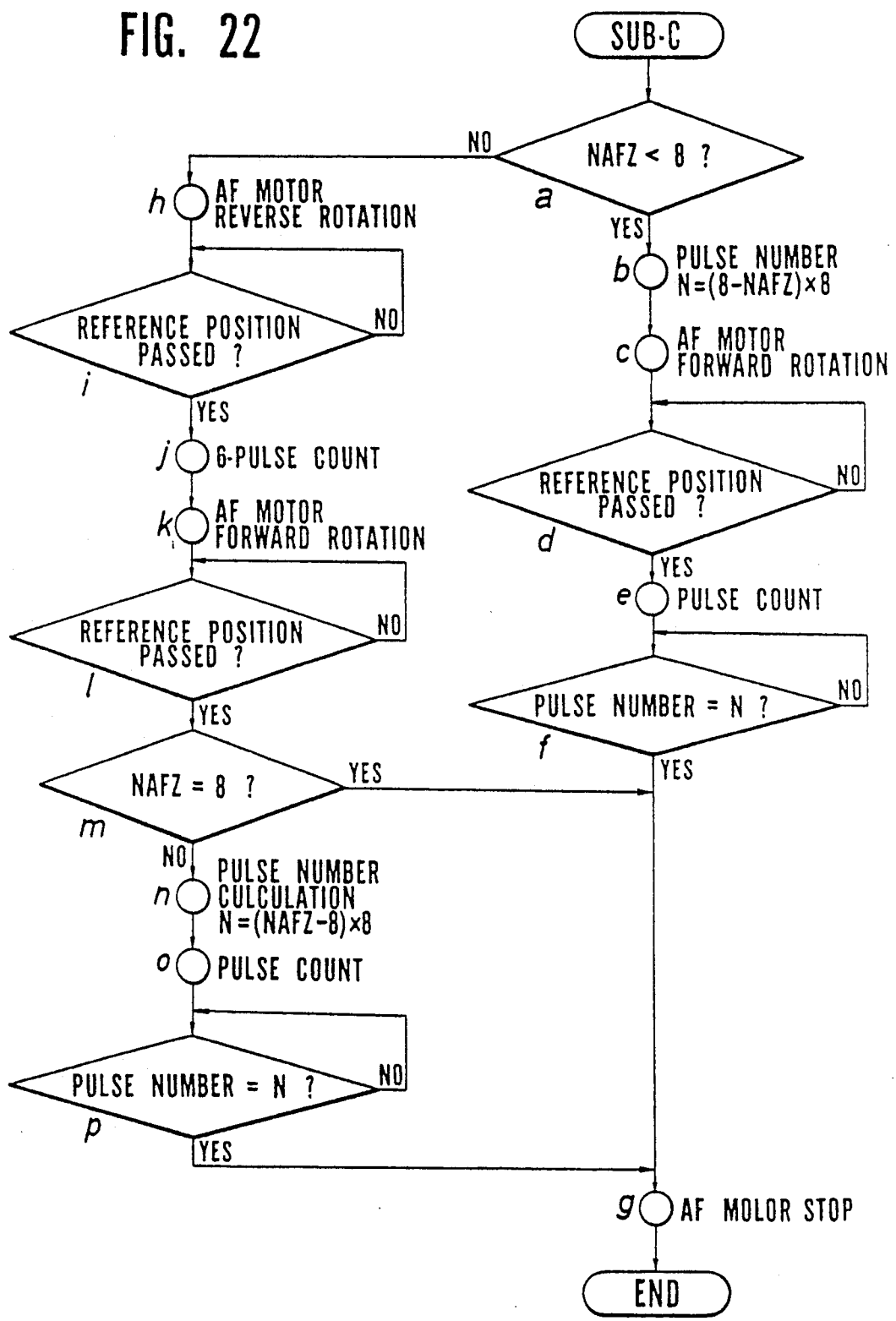

FIG. 22 is a flow chart showing a subroutine for moving the photographic lens from the initial position to the in-focus position.

In this subroutine SUB-C, it is checked whether the measured distance zone No. NAFZ determined on the basis of the distance measurement information is smaller than 8 in step a. That is, one of the first and second moving regions is selected. In the camera of this embodiment, normal distance photographing is determined when the measured distance zone No. NAFZ is less than 8, and close-up photographing is determined when it is 8 or more.

When the measured distance zone No. NAFZ is less than 8 and the normal distance photographing is determined in step a, the number N of moving pulses is calculated to move the photographic lens 50 to the in-focus position (step b). Assuming that the necessary number of output pulses from the photointerruptor 173 is, e.g., 8 with respect to movement through one zone of the measured distance zones, the moving pulse number N is calculated by the following equation:

moving pulse number $N=(8-NAFZ)\times 8$.

After the moving pulse number N is calculated, the AF motor 170 is reversely rotated (step c). When the position detection contact 175b passes the edge Y3a of the reference position pattern Y3 (step d), pulses are counted from this reference point (step e). When the pulse count reaches the moving pulse number N (step f), the AF motor 170 is stopped (step g).

If the measured distance zone No. NAFZ is 8 or more and the close-up photographing is determined in step a, the AF motor 170 is reversely rotated (step h). When the position detection contact 175b passes the edge Y3a of the reference position pattern Y3 (step i), six pulses, for example, are counted from this timing (step j), and the AF motor is rotated forward (step k).

As the result, the barrel 51 is extended, and whether the measured distance zone No. NAFZ is 8 is checked (step m) when the position detection contact 175b passes the edge Y3a of the reference position pattern Y3 (step l). When the measured distance zone No. NAFZ is 8, the AF motor 170 is stopped to keep the barrel 51 at the in-focus position (step g).

If the measured distance zone No. NAFZ is larger than 8 in step m, the number N of moving pulses is calculated to move the barrel 51 to the in-focus position (step n). As described above, the moving pulse number N is similarly calculated by the following equation:

moving pulse number $N=(NAFZ-8)\times 8$.

After the moving pulse number N is calculated, the AF motor 170 is rotated forward, and pulses are counted from the reference point (step o). When this pulse count reaches the moving pulse number N (step p), the AF motor 170 is stopped to keep the photographic lens 50 at the in-focus position (step g).

In the camera of this embodiment, the measured distance zone AFZ is divided such that the respective divided measured distance zones AFZ have the same length. When the edge Y3a of the reference position pattern Y3 is arranged on a boundary between the distance measurement zones AFZ7 and AFZ8, and the moving pulse number N is calculated in accordance with the above equation, the photographic lens 50 is not stopped at the center of each measured distance zone determined along the optical axis of the photographic lens upon focusing movement. Therefore, the edge Y3a is actually arranged at the center of the distance measurement zone AFZ8. As described above, however, when the position detection contact 175b passes the edge Y3a, the CPU 220 discriminates the first and second moving regions to execute control of normal distance photographing and close-up photographing. Therefore, it is not wrong to say that the edge Y3a functionally exists on the boundary between the first and second moving regions. This expression rather clearly indicates the executed function.

Figure 23:
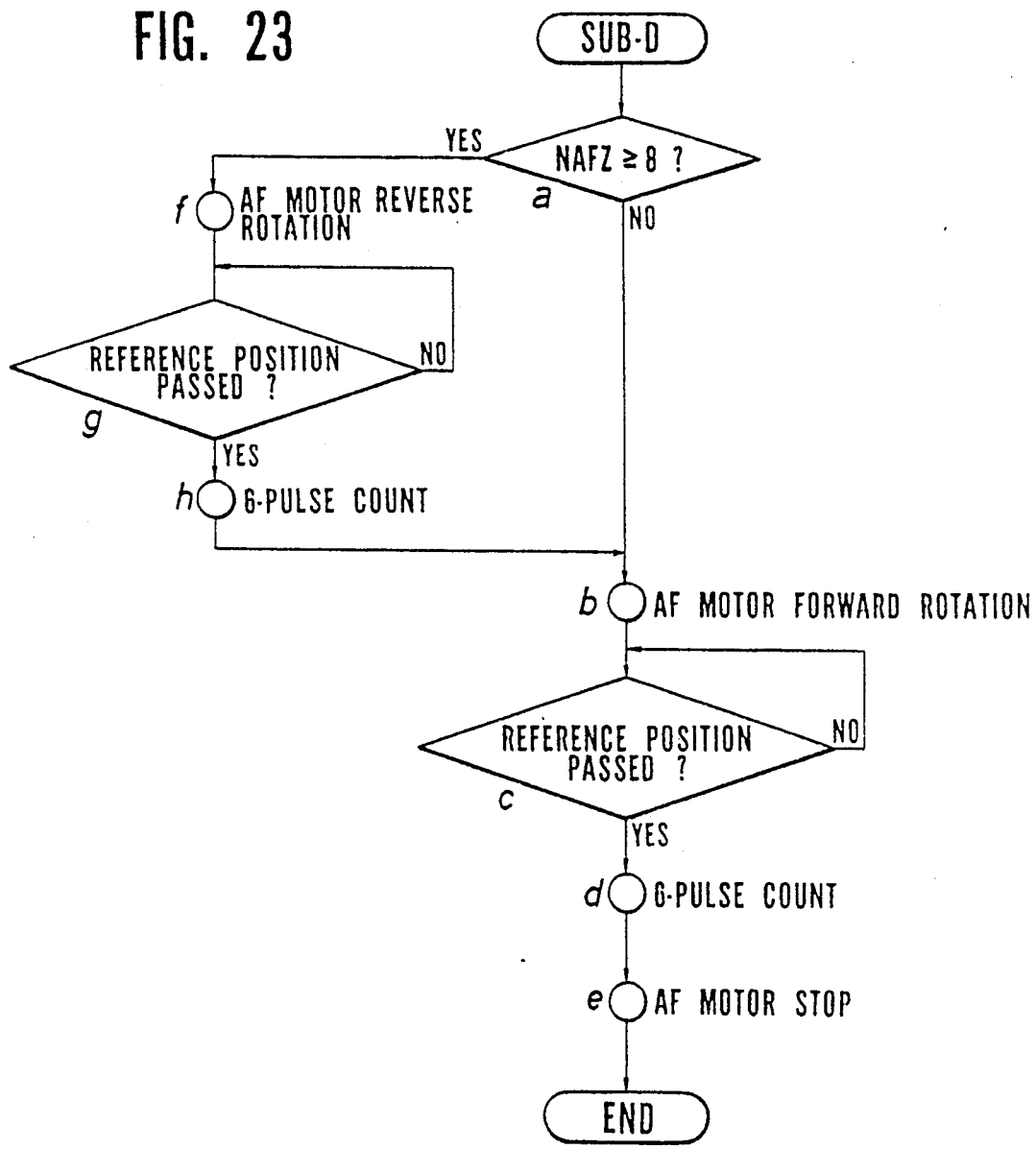

FIG. 23 is a flow chart showing a subroutine for moving the photographic lens from the in-focus position to the initial position.

In this subroutine SUB-D, it is checked whether the measured distance zone No. NAFZ determined on the basis of the distance measurement information is less than 8 (step a). When the measured distance zone No. NAFZ is less than 8 in step a, the AF motor 170 is rotated forward to extend the barrel 51 (step b). When the position detection contact 175b passes the edge Y3a of the reference position pattern Y3 upon extension of the barrel 51 (step c), six pulses, for example, are counted from this reference point (step d), and the AF motor 170 is stopped to keep the barrel 51 at the initial position (step e).

When the measured distance zone No. NAFZ is 8 or more in step a, the AF motor 170 is reversely rotated (step f). When the position detection contact 175b passes the edge Y3a of the reference position pattern Y3 (step g), six pulses, for example, are counted from this reference point (step h), and the flow advances to step b. In step b, the AF motor 170 is rotated forward to extend the barrel 51. When the position detection contact 175b passes the edge Y3a of the reference position pattern Y3 (step c), six pulses, for example, are counted from this reference point (step d), and the AF motor 170 is stopped to keep the barrel 51 to the initial position (step e).

Figure 24:
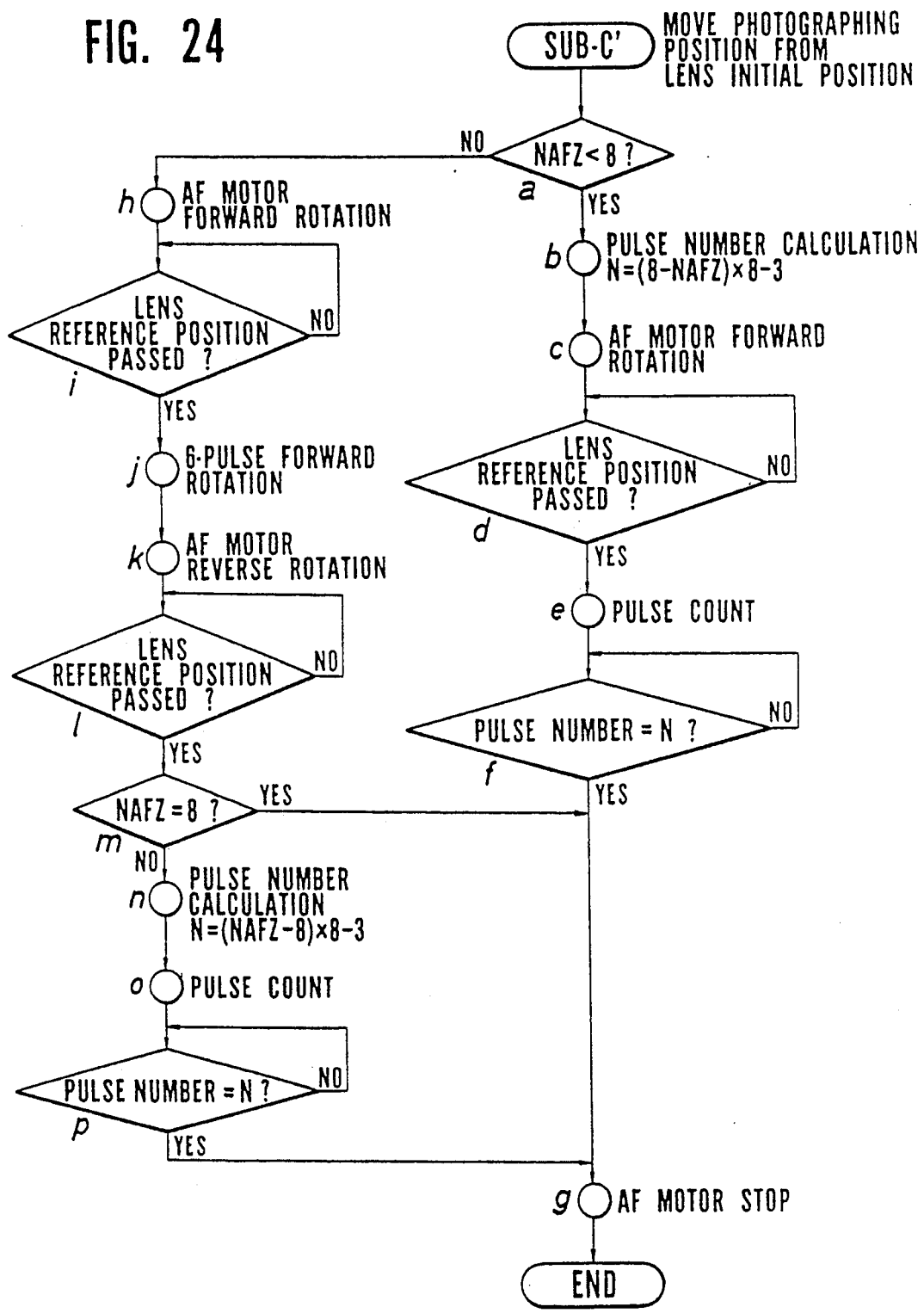

FIG. 24 is a flow chart showing a subroutine according to another embodiment for moving the photographic lens from the initial position to the in-focus position.

Although a subroutine SUB-C' of this embodiment is similar to the subroutine SUB-C shown in FIG. 22, this flow chart is provided in consideration of overrun caused when the AF motor 170 is stopped.

Assume that overrun of a predetermined number of pulses, e.g., three pulses is caused when the AF motor is stopped after it is rotated for eight pulses or more. And assume that the number of pulses for stopping the photographic lens at the initial position, i.e., six in this embodiment is determined in consideration of this overrun.

Therefore, when the measured distance zone No. NAFZ is less than 8 in step a, the number N of moving pulses is calculated in step b by the following equation in consideration of the overrun of three pulses caused when the photographic lens is to be stopped at the in-focus position:

moving pulse number $N = (8 - NAFZ) \times 8 - 3$.

After the moving pulse number N is calculated, the AF motor 170 is reversely rotated. When the position detection contact 175b passes the edge of the reference position pattern Y3, pulses are counted from this reference point. When the pulse count reaches the moving pulse number, the AF motor 170 is stopped.

When the measured distance zone No. NAFZ is 8 or more in step a, the flow advances from step h to step n through step m, and the moving pulse number N is calculated in consideration of the overrun by the following equation:

moving pulse number $N = (NAFZ - 8) \times 8 - 3$.

After the moving pulse number N is calculated, the AF motor 170 is rotated forward, and pulses are counted from the reference point. When the pulse count reaches the moving pulse number N, the AF motor 170 is stopped to keep the barrel 51 at the in-focus position.

FIG. 25 is a flow chart for shifting an exposure amount in accordance with the in-focus position.

In step a, an exposure amount is determined on the basis of a photometered value and film speed information. It is checked whether the measured distance zone No. NAFZ determined in accordance with distance measurement information is 13 or more (step b). When the measured distance zone No. NAFZ is 13 or more and a distance to an object is a predetermined distance or less, the exposure amount is increased by a predetermined amount to compensate for insufficient exposure caused because an aperture position is farther from a film (step c), thereby performing correction for close-up photographing.

When the measured distance zone No. NAFZ is less than 13 and the distance to the object exceeds the predetermined distance in step b, the flow advances to step d, and no exposure amount correction is performed.

A shutter opening time is determined in step d in accordance with the exposure amount determined as described above, and a constant voltage is supplied to the shutter motor 80 on the basis of the shutter opening time, thereby the shutter is opened (step e).

The shutter opening operation is detected by a change in the photointerruptor 99 (step f), the camera waits for a predetermined time interval using a timer to keep the shutter open (step q), and the shutter motor 80 is reversely rotated to close the shutter (step h). The camera waits for a predetermined time interval to completely close the shutter (step i), and the shutter motor 80 is stopped (step j).

In this embodiment, the first moving region corresponds to the normal photographing range, and the second moving region corresponds to the close-up photographing range. However, the present invention is not limited to the above embodiment, and the regions corresponding to the two ranges may be switched. In this embodiment, the above relationship is set in consideration of more frequent use.

According to the present invention as described above, when the selecting means selects the first moving region, the photographic lens driving means is driven to move the photographic lens from the initial position toward the reference point, and the photographic lens is stopped at the in-focus position on the basis of inputs of moving amount information and object distance information. When the selecting means selects the second moving region, the photographic lens driving means is driven to move the photographic lens from the initial position toward the reference point, and driving in the opposite direction is performed in response to an input of reference point information from the reference point detecting means. The photographic lens is stopped at the in-focus position on the basis of inputs of object distance information and moving amount information obtained after the photographic lens passes the reference point again. Therefore, the photographic lens can be stopped beforehand at the initial position set in the second moving region and close to the boundary between the first and second moving regions.

In general photographing, a photographic lens is frequently stopped near the boundary upon focusing. Therefore, the photographic lens is stopped at the initial position and moved from the initial position to the in-focus position on the basis of distance measurement information, thereby the moving amount of the photographic lens upon focusing movement is decreased. For this reason, the precision of moving amount control can be easily improved, and failures such as camera shake can be prevented because a moving time is shortened.

In addition, since the camera automatically selects the normal distance photographing or the close-up photographing, a photographer need not determine a photographic distance to set the camera in a normal distance photographic more or a close distance photographic mode. Therefore, both the normal distance photographing and the close-up photographing can be easily executed.

What is claimed is:
1. A camera comprising a main body provided with an aperture, a photographic lens, a mounting unit on said main body and movable with respect thereto, a guide shaft for said mounting unit, a support mounted on said main body and comprising a first portion and a second portion, said first portion having a recess on one face and a projecting portion complementary to said recess on another face, said projecting portion engaging said aperture, one end of said guide shaft on said first portion and another end of said guide shaft on said second portion, whereby said guide shaft extends in an optical axis direction of said lens; and a bearing connected to said mounting unit and slidable along said guide shaft, at least part of said bearing being adapted to enter said recess.

2. The camera of claim 1 wherein said one end is fixed in said recess.

3. The camera of claim 1 wherein said aperture is at said rear portion, said projecting portion engaging said rear portion.

4. The camera of claim 1 wherein said aperture is at a rear portion of said camera.

5. The camera of claim 4 wherein said one end is fixed in said recess.

6. The camera of claim 5 comprising a film feeding plane, at or adjacent said rear portion, of said camera adapted to receive film fed to said camera, said projecting portion being clear of said plane.

7. The camera of claim 6 wherein said plane is behind said projecting portion.

8. The camera of claim 5 wherein said mounting unit comprises a lens barrel frame in which said lens is mounted.

9. The camera of claim 8 wherein said barrel frame is connected to said bearing thereby moving said mounting unit with said bearing.

10. The camera of claim 5 further comprising a driver for said mounting unit, said driver having a driving shaft which transmits driving power from said driver to said mounting unit.

11. The camera of claim 10 wherein one end of said driving shaft is connected to said second portion and is parallel to said guide shaft.

12. The camera of claim 11 wherein another end of said driving shaft is connected to said first portion of said support.

13. The camera of claim 1 comprising a film feeding plane, at or adjacent said rear portion, of said camer adapted to receive film fed to said camera, said projecting portion being clear of said plane.

14. The camera of claim 13 wherein said plane is behind said projecting portion.

15. The camera of claim 14 wherein said mounting unit comprises a lens barrel frame in which said lens is mounted.

16. The camera of claim 15 wherein said barrel frame is connected to said bearing thereby moving said mounting unit with said bearing.

17. The camera of claim 4 wherein said plane is behind said projecting portion.

18. The camera of claim 1 further comprising a driver for said mounting unit, said driver having a driving shaft which transmits driving power from said driver to said mounting unit.

19. The camera of claim 18 wherein one end of said driving shaft is connected to said second portion and is parallel to said guide shaft.

20. The camera of claim 19 wherein another end of said driving shaft is connected to said first portion of said support.

21. A camera comprising a body having a front portion and a rear portion, an aperture at said rear portion, a photographic lens, a mounting unit on said front portion and movable with respect thereto, a guide shaft for said mounting unit, a support for said shaft;

said support including a first portion and a second portion, said first portion having a recess on one face and a projecting portion complementary to said recess on another face;

one end of said guide shaft on said first portion and another end of said guide shaft on said second portion, said support being between said front portion and said rear portion, said projecting portion of said support engaging said aperture whereby said guide shaft extends between said front portion and said rear portion substantially parallel to an optical axis of said lens;

a bearing connected to said mounting unit and slidable along said guide shaft, at least a part of said bearing adapted to enter said recess.

22. The camera of claim 21 wherein said one end of said guide shaft is in said recess.

23. The camera of claim 22 comprising a film feeding plane, at or adjacent said rear portion of said camera adapted to receive film fed to said camera, said projecting portion being clear of said plane.

24. The camera of claim 23 wherein said plane is behind said projecting portion.

25. A camera comprising a main body provided with an aperture, a photographic lens, a mounting unit on said main body and movable with respect thereto, a guide shaft for said mounting unit, a support mounted on said main body and comprising a first portion and a second portion said first portion having a recess on one face and a projecting portion complementary to said recess on another face, said projecting portion engaging said aperture, one end of said guide shaft on said first portion and another end of said guide shaft on said second portion, whereby said guide shaft extends in an optical axis direction of said lens; and a bearing connected to said mounting unit and slidable along said guide shaft.

26. The camera of claim 25 wherein said one end of said guide shaft is in said recess.

27. The camera of claim 26 wherein said plane is behind said projecting portion.

* * * * *